US011864150B2

(12) United States Patent
Smith et al.

(10) Patent No.: US 11,864,150 B2
(45) Date of Patent: Jan. 2, 2024

(54) UPLINK COORDINATED MULTIPOINT POSITIONING

(71) Applicants: Roland Smith, Nepean (CA); Miguel Berg, Sollentuna (SE); Satyam Dwivedi, Solna (SE); Mike Skof, Nepean (CA)

(72) Inventors: Roland Smith, Nepean (CA); Miguel Berg, Sollentuna (SE); Satyam Dwivedi, Solna (SE); Mike Skof, Nepean (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 260 days.

(21) Appl. No.: 17/295,086

(22) PCT Filed: Dec. 13, 2019

(86) PCT No.: PCT/IB2019/060795
§ 371 (c)(1),
(2) Date: May 19, 2021

(87) PCT Pub. No.: WO2020/128764
PCT Pub. Date: Jun. 25, 2020

(65) Prior Publication Data
US 2022/0095261 A1    Mar. 24, 2022

Related U.S. Application Data

(60) Provisional application No. 62/782,886, filed on Dec. 20, 2018.

(51) Int. Cl.
*H04W 64/00*    (2009.01)
*G01S 5/02*    (2010.01)
(Continued)

(52) U.S. Cl.
CPC ............ *H04W 64/00* (2013.01); *G01S 5/0244* (2020.05); *G01S 5/06* (2013.01); *H04B 7/024* (2013.01);
(Continued)

(58) Field of Classification Search
CPC ........ H04W 64/00; G01S 5/0244; G01S 5/06; G01S 2205/001; G01S 2205/01; H04B 7/024; H04L 5/0048
See application file for complete search history.

(56) References Cited

U.S. PATENT DOCUMENTS

2009/0149132 A1    6/2009  LeFever et al.
2017/0272297 A1*   9/2017  Bertrand ............. H04J 13/0062
2018/0014268 A1*   1/2018  Kuppusamy .......... H04L 27/266

FOREIGN PATENT DOCUMENTS

EP            2746802 A1    6/2014
WO       WO2014093400 A1    6/2014

OTHER PUBLICATIONS

ISR and WO for PCT/IB2019/060795.
(Continued)

*Primary Examiner* — Kabir A Timory
(74) *Attorney, Agent, or Firm* — Ericsson Inc.

(57) ABSTRACT

A method and network node for uplink coordinated multipoint positioning are disclosed. According to one aspect, a method includes employing a coordinated multipoint function to decode data from a WD using signals received from the WD by the network node and from signals received from the WD by a plurality of cooperating network nodes. The method further includes converting the decoded WD data signal into a time domain reference signal and convert the signals received from the plurality of cooperating network nodes into time domain neighbour signals. The method also includes cross-correlating the time domain reference signal with the time domain neighbour signals to determine a time (Continued)

difference of arrival for each of the plurality of time domain neighbour signals. The method also includes calculating a position of the WD based on the time differences of arrival and based on locations of the cooperating network nodes.

20 Claims, 14 Drawing Sheets

(51) Int. Cl.
　　　G01S 5/06　　　　(2006.01)
　　　H04B 7/024　　　(2017.01)
　　　H04L 5/00　　　　(2006.01)
(52) U.S. Cl.
　　　CPC ...... *H04L 5/0048* (2013.01); *G01S 2205/001* (2013.01)

(56) References Cited

OTHER PUBLICATIONS

Ericsson: "Summary of RAT dependent positioning methods in 7.2.10.3 at RAN1#95", 3GPP Draft; R1-1814005 Ericsson RAT Summary for Techniques, 3rd Generation Partnership Project (3GPP), Mobile Competence Centre ; 650, Route Des Lucioles ; F-06921 Sophia-Antipolis Cedex ; France, vol. RAN WGI, No. Spokane, United States; Nov. 12, 2018-Nov. 16, 2018, Nov. 14, 2018 (Nov. 14, 2018), XP051494447.

\* cited by examiner

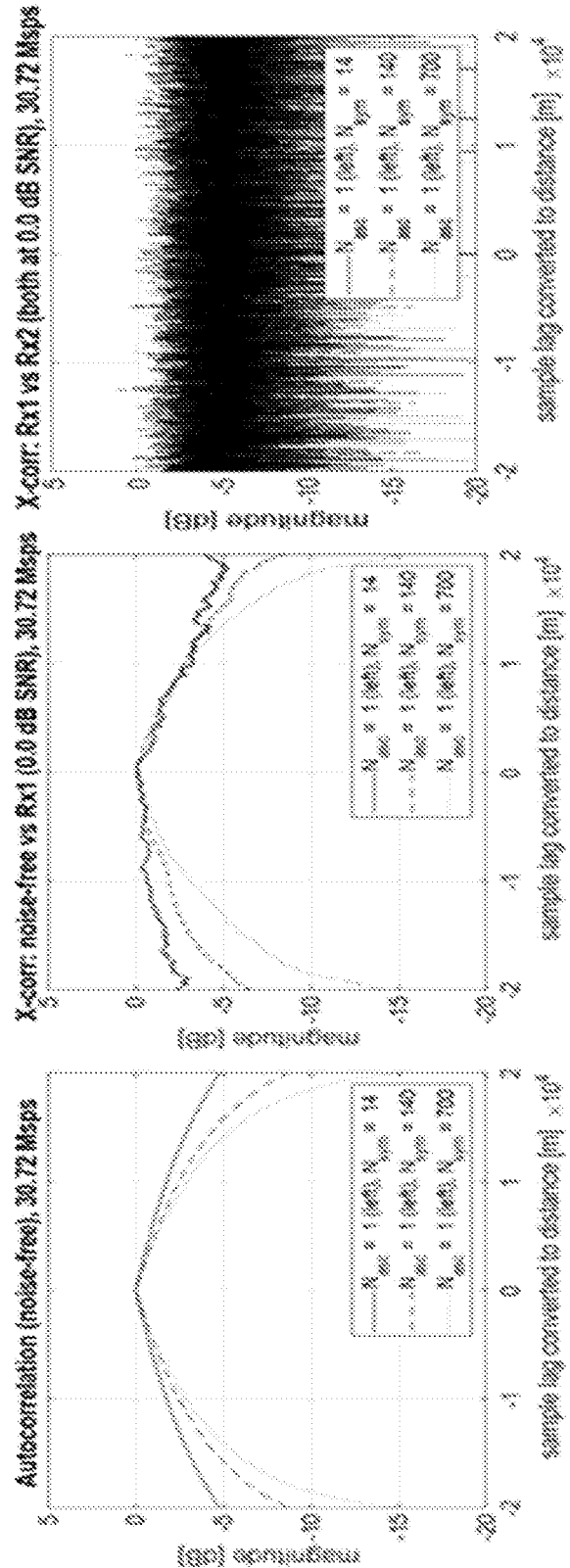

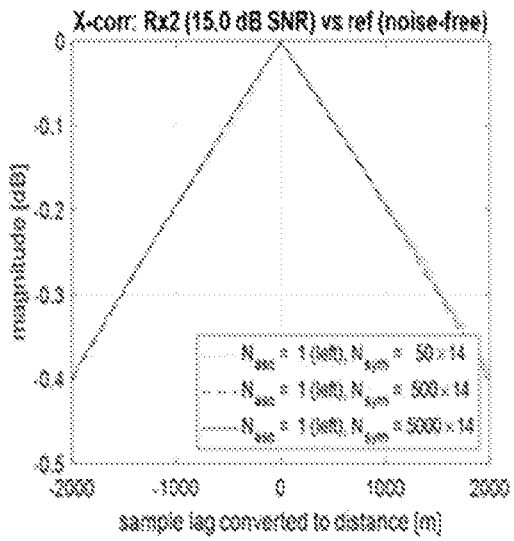
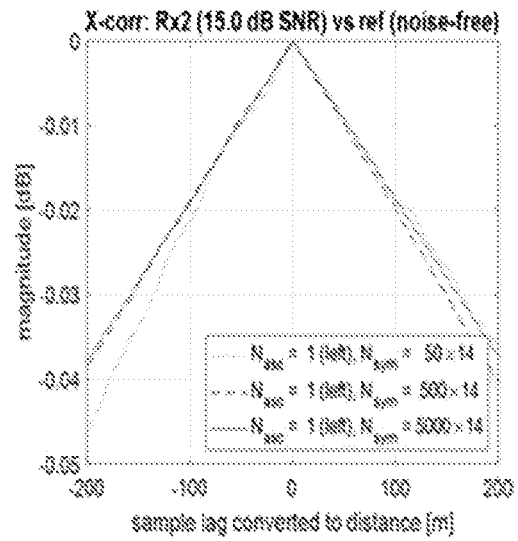
FIG. 10A  FIG. 10B
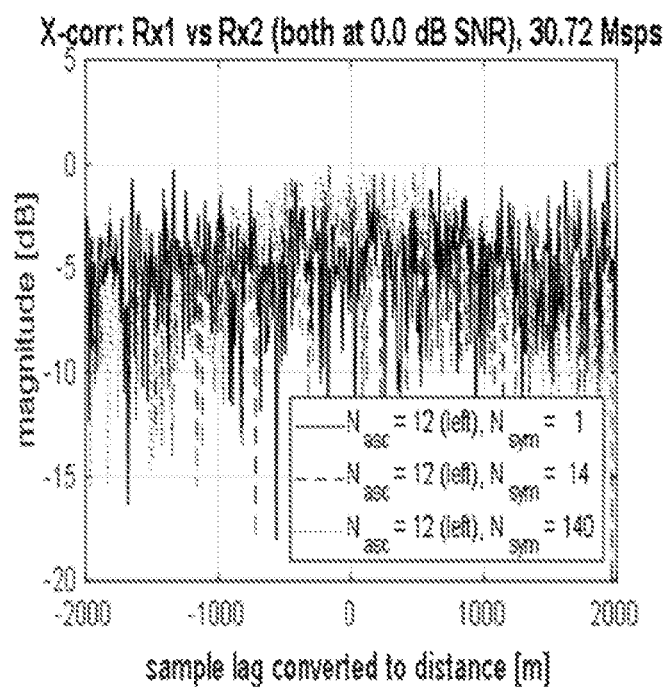
FIG. 11

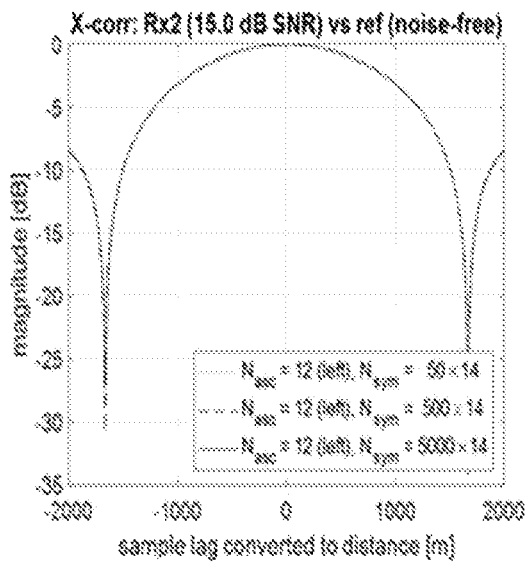
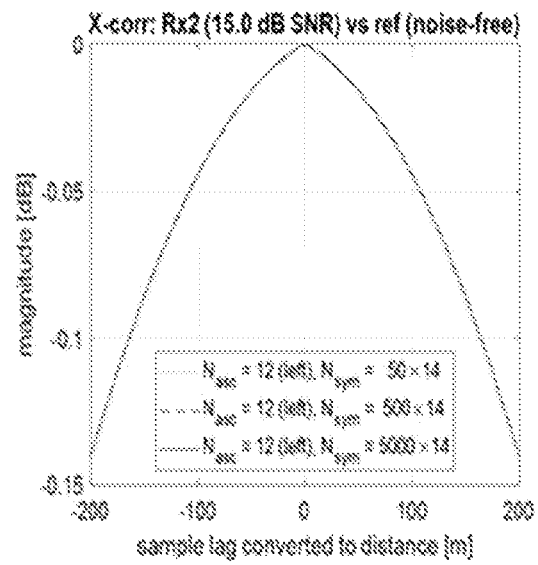
FIG. 12A    FIG. 12B
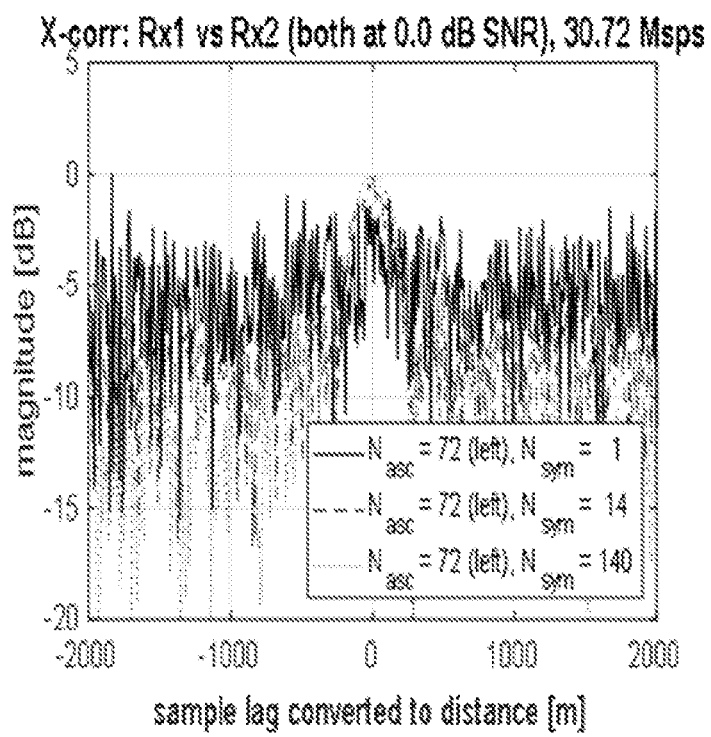
FIG. 13

UPLINK COORDINATED MULTIPOINT POSITIONING

This application is a 35 U.S.C. § 371 national phase filing of International Application No. PCT/IB2019/060795, filed Dec. 13, 2019, the content of which is incorporated herein by reference in its entirety.

TECHNICAL FIELD

The present disclosure relates to wireless communications, and in particular, to uplink (UL) coordinated multipoint (CoMP) positioning.

BACKGROUND

There is currently no viable network-based positioning technology for determining the position of Internet of things (IoT) devices which meets industry accuracy requirements of ±10 meters (m), and at the very least ±50 m.

Legacy power-based positioning solutions employing reference signal received power (RSRP) measurements provided by the wireless device (WD) are well known to have extremely poor accuracy. While RSRP measurements are better than strongest Cell identification (CID) positioning, RSRP based positioning methods have typical accuracies in the hundreds of meters.

Legacy timing-based positioning solutions are generally better, with typical accuracies often better than ±50 m, but only for 10 MHz or higher bandwidth Fourth Generation (4G) channels. IoT devices, such as Category M1 or NB1 with bandwidths of 1.08 MHz and 180 kHz, respectively, have poorer positioning accuracies of ±200 m. While combined power and timing 4G positioning solutions such as adaptive enhanced cell identity (AECID) are demonstrated to improve these accuracies, typical results are still outside of industry expectations and requirements.

Next-generation 5G (also referred to as "New Radio" and "NR") radios introduce large antenna arrays capable of 2-dimensional beamforming and are expected to positively improve IoT positioning accuracies. High order 5G numerologies enabling wider channels, such as 50 MHz, 100 MHz, and 200 MHz channels, will improve positioning of high bandwidth devices. However, they will have little or no benefit for narrow band IoT devices. In summary, while the cellular network is undergoing a significant evolution with the Internet of Things introducing network connectivity to billions of new low powered devices, the ability to locate these devices to meet industry expectations is lacking.

There may be no reliable, accurate, and globally accepted means to obtain location information for Third Generation Partnership Project (3GPP) IoT technology. While the Global Positioning System (GPS) may in some cases be useful in outdoor venues, it generally does not work for indoor locations. Also, GPS receivers consume considerable power and cannot be used in many IoT applications where a long battery life is needed. Wi-Fi may be used, but that too consumes much power, and moreover, Wi-Fi networks are not ubiquitous, and hence cannot be relied on as a means of IoT geolocation.

None of the 3GPP solutions achieve accuracies below 10 m necessary for IoT. An improved solution is therefore desired. European Telecommunications Standards Institute (ETSI) Technical Specification (TS) "ETSI TS 136 133 V12.18.0 (2018-01) LTE; Evolved Universal Terrestrial Radio Access (E-UTRA); Requirements for support of radio resource management (3GPP TS 36.133 version 12.18.0 Release 12)" defines the Reference Signal Time Difference (RSTD) accuracy for intra-frequency and inter-frequency measurements for Categories M1 and NB1 signals. ("LTE" refers to Long Term Evolution).

Note that category M1 signals have 6 resource blocks (RB) of bandwidth, equivalent to 1.08 Mega Hertz (MHz), whereas category NB1 signals have 1 RB of bandwidth, equivalent to 180 kilo Hertz (kHz). These two classifications of 3GPP IoT radios cover different application spaces. Category M1 devices enable higher bandwidth applications, consume more power, and are used in applications where power is not a concern. Category NB1 devices are intended for low bandwidth applications, consume minimal power, and as such, are often battery powered, and may use solar charging of batteries. Cat M1 applications include connected vehicles, while Cat NB1 applications include parking meters, for example. Location measurement accuracy is important for both IoT technologies.

Measurement accuracy for the wider IoT bandwidth of Category M1 wireless devices (WDs) is ±15 Ts for intra-frequency, and ±20 Ts for inter-frequency. Ts is a basic timing unit defined in technical standard (TS) 36.211 equal to $1/(15000 \times 2048)$ seconds, and can be approximated as 32.5 nanoseconds, representing one cycle of a 30.72 MHz sampling rate. Measurement accuracy for the narrower IoT bandwidth of Category NB1 WDs is ±21 Ts for intra-frequency operation and ±28 Ts for inter-frequency operation, for "normal coverage." These accuracies are relaxed for "extended coverage" to ±32 Ts for intra-frequency operation and ±40 Ts for inter-frequency operation.

For reference, an error of ±1 Ts translates into a positional error of ±10 m for a radio frequency speed of 300 meters (m) per microsecond (µs), which is equivalent to 3.33 nanoseconds per meter (ns/m). An error of ±20 Ts translates into a positioning error of ±200 m.

These errors are significant and show that RSTD measurements do not meet the requirements of IoT and 5G positioning detailed in 3GPP TS 22.261 and in "Perspectives on Vertical Industries and Implications for 5G," which describe 5G location accuracy requirements by industry category, some of which are as follows:

Automotive, <1 meter;
Transport, logistics, IoT, <1 meter;
Health and wellness, smart cities, <10 meter; and
Media and entertainment, <1 meter These documents do not describe the methodology to achieve these accuracies, but rather, simply state requirements for the different industry categories. ETSI TS 22 261 further provides a description in section 7.3 of "Higher-Accuracy Positioning" characterized by "ambitious system requirements for positioning accuracy" which states:

"A typical area where "higher-accuracy positioning" is needed is collision avoidance of vehicles: every vehicle must be aware of its own position, the positions of near-by vehicles, and their expected paths, to avoid collisions. On the factory floor, it is important to locate moving objects such as forklifts, or parts to be assembled."

While ETSI TS 136 133 does not provide details on how to achieve the above accuracies, it does suggest improving measurement accuracies via increased sampling. Table 9.1.22.10-1: "Intra RSTD measurement accuracy for normal coverage" details the "minimum number of available measurement subframes among the reference cell and the measured neighbor cell i, NNPRS_total" enabling WDs to make up to 320 RSTD measurements, with the implicit expectation of improved accuracies as samples are averaged. This assumes that a positioning measurement error of ±20 Ts or ±200 m may be reduced to better than ±1 m by employing 320 RSTD measurements.

However, IoT WDs sample at very low rates, typically at intervals of 16 Ts (520 ns) for Category M1, and as slow as 96 Ts (3.125 µs) for Category NB1 devices. While WDs may use various techniques of averaging and interpolation to improve measurement results, their slow sampling rate limits their overall accuracy.

SUMMARY

An aspect of the present disclosure provides a method implemented in a network node to estimate a time difference of arrival, TDoA, of signals received from a wireless device. A coordinated multipoint process is employed to decode data from a WD using signals received from the WD by the network node and from signals received from the WD by a plurality of cooperating network nodes. The decoded WD data signal is converted into a time domain reference signal and the signals received from the plurality of cooperating network nodes are converted into time domain neighbor signals. The time domain reference signal is cross-correlated with the time domain neighbor signals to determine a time difference of arrival for each of the plurality of time domain neighbor signals. A position of the WD is calculated based on the time differences of arrival and based on locations of the cooperating network nodes.

A further aspect of the present disclosure provides a method implemented in a network node to estimate a time difference of arrival, TDoA, of signals received from a wireless device. A coordinated multipoint process is employed to decode data from a WD using signals received from the WD by the network node and from signals received from the WD by a plurality of cooperating network nodes. The decoded WD data is converted into a frequency domain reference signal, and the signals received from the plurality of cooperating network nodes are converted into frequency domain neighbor signals. A complex conjugate of the frequency domain reference signal is multiplied by each of the plurality of frequency domain neighbor signals to produce a plurality of product signals. Each of the product signals is converted into a time domain signal to provide a time difference of arrival of each frequency domain neighbor signal. A position of the WD is calculated based on the time differences of arrival and based on locations of the cooperating network nodes.

In some embodiments, the network node is further configured to provide a reportConfigEUTRA WD measurement report with a negative A3-Offset greater than 19.

In some embodiments, the network node is further configured to perform geometric dilution of precision calculations to select a set of cooperating network nodes for use in positioning calculations.

In some embodiments, the network node is further configured to bound a channel impulse response in the time domain using a calculated channel impulse response of a demodulation reference signal, DMRS, symbol from at least one of the plurality of time domain neighbor signals.

In some embodiments, the network node is further configured to use a reference signal transmitted by the WD in every resource block to confirm a channel impulse response calculated from the cross correlation.

In some embodiments, a reference signal is selected from signals received from the WD by the network node as a signal having a signal to noise ratio, SNR, of at least 10 dB.

In some embodiments, the network node is further configured to use trilateration based on reference signal received power, RSRP, to provide an initial estimate of WD location followed by subsequent iterations based on cross correlation of the time domain reference signal with the time domain neighbor signals.

In some embodiments, the network node is located remote from the cooperating network nodes and wherein positions of WDs are determined at the remote location.

In some embodiments, the received signals are transmitted over a full transmission time interval, TTI, consisting of 14 symbols.

Some embodiments advantageously provide methods and network nodes for uplink (UL) coordinated multipoint (CoMP) positioning. According to one aspect, a method includes employing a coordinated multipoint function to decode data from a WD using signals received from the WD by the network node and from signals received from the WD by a plurality of cooperating network nodes. The method further includes converting the decoded WD data signal into a time domain reference signal and convert the signals received from the plurality of cooperating network nodes into time domain neighbor signals. The method also includes cross-correlating the time domain reference signal with the time domain neighbor signals to determine a time difference of arrival for each of the plurality of time domain neighbor signals. The method also includes calculating a position of the WD based on the time differences of arrival and based on locations of the neighbor cells.

Thus, in some embodiments, a reference signal received at a hosting network node from a WD is cross-correlated with signals received from the WD at other cooperating network nodes to determine time differences of arrival of the WD, from which position can be determined.

Some embodiments may use one or more of IoT RSRP, reference signal received quality (RSRQ) and observed time difference of arrival (OTDoA) measurement reports, with UL positioning, based on one or more of the following:

Some embodiments use up-link coordinated multi-point reception, modifying the selection criteria to include geometry to minimize the dilution of precision of trilateration calculations;

IoT measurement reports for UL positioning, over-sampled at Ts by a base station (eNB/gNB), may be treated as being uncorrelated in the time domain, and may be used to estimate the channel impulse response;

IoT positioning accuracies may be improved through sequential measurement reports, each of which has unique data, and channel impulse response correlations; and IoT downlink (DL) positioning measurements may be optimally combined (RSRP and OTDoA reports) with UL measurements, according to their relative variances.

Embodiments of a network node, base station, communication system, and a method in a communication system are also disclosed.

BRIEF DESCRIPTION OF THE DRAWINGS

The accompanying drawing figures incorporated in and forming a part of this specification illustrate several aspects of the disclosure, and together with the description serve to explain principles of the disclosure.

FIGS. 9A-9C respectively show graphs of channel impulse response computed by reference signals with and without noise;

FIGS. 10A and 10B show respective graphs of channel impulse responses useful for estimating TDoA;

FIG. 11 shows a graph of channel impulse response computed by reference signals having low SNR;

FIGS. 12A and 12B shows a graph of channel impulse response computed using a noise free reference signal correlated against a signal from a cooperating network node;

FIG. 13 shows a graph of channel impulse response computed when both the reference signal and the compared antenna signal are noisy;

DETAILED DESCRIPTION

Figure 1:
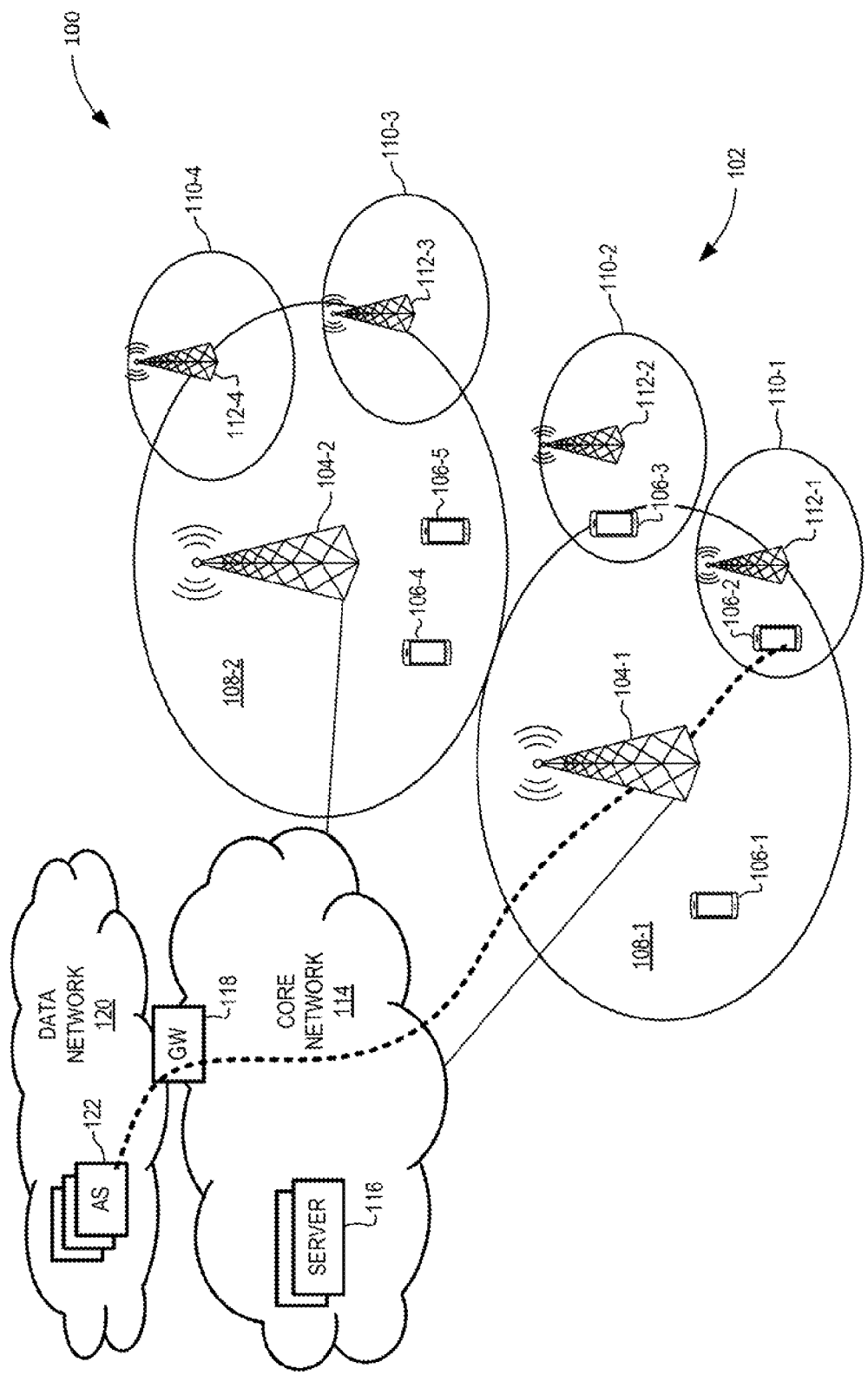
FIG. 1 is a block diagram schematically illustrating a representative network in which embodiments of the present invention may be deployed.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

At least some of the following abbreviations and terms may be used in this disclosure.

2D Two Dimensional
3GPP Third Generation Partnership Project
5G Fifth generation radio
AAS Antenna Array System
AoA Angle of Arrival
AoD Angle of Departure
ASIC Application Specific Integrated Circuit
BF Beamforming
BLE Bluetooth Low Energy
BLER Block Error Rate
BW Beamwidth
Cell Portion A geographical portion of a cell covered by a single antenna beam
CPU Central Processing Unit
CSI Channel State Information
dB Decibel
DCI Downlink Control Information
DFT Discrete Fourier Transform
DL Downlink
DSP Digital Signal Processor
DU Digital Unit
E911 Enhanced 911, used for mobile technology
E-CID Enhanced Cell ID
eNB Enhanced or Evolved Node B
FIR Finite Impulse Response
FPGA Field Programmable Gate Array
gNB New Radio Base Station
GPS Global Positioning System
iBeacon Apple terminology for their 802.15 BLE beacon product
ICC Information Carrying Capacity
IIR Infinite Impulse Response
KPI Key Performance Index
LBS Location Based Services
LPPa LTE Positioning Protocol A
LTE Long Term Evolution
MIMO Multiple Input Multiple Output
MME Mobility Management Entity
MMSE Minimum Mean Square Error
MTC Machine Type Communication
NR New Radio
OTT Over-the-Top
PBCH Physical Broadcast Channel
PDCCH Physical Downlink Control Channel
PDSCH Physical Downlink Shared Channel
P-GW Packet Data Network Gateway
RAM Random Access Memory
ROM Read Only Memory
RRC Radio Resource Control
RRH Remote Radio Head
RSRP Reference Signal Received Power
RSSI Received Signal Strength Indication
SCEF Service Capability Exposure Function
SINR Signal to Interference plus Noise Ratio
TBS Transmission Block Size
ToA Time-of-Arrival
UE User Equipment
UL Uplink
ULA Uniform Linear Array
URA Uniform Rectangular Array Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting (and/or receiving) signals to (and/or from) a radio access node. Some examples of a wireless device include, but are not limited to, a User Equipment device (WD) in a 3GPP network and a Machine Type Communication (MTC) device.

Network Node: As used herein, a "network node" is any node that is either part of the radio access network or the core network of a cellular communications network/system.

Cell: As used herein, a "cell" is a combination of radio resources (such as, for example, antenna port allocation, time and frequency) that a wireless device may use to exchange radio signals with a radio access node, which may be referred to as a host node or a serving node of the cell. However, it is important to note that beams may be used instead of cells, particularly with respect to 5G NR. As such, it should be appreciated that the techniques described herein are equally applicable to both cells and beams.

Note that references in this disclosure to various technical standards (such as 3GPP TS 38.211 V15.1.0 (2018-03) and 3GPP TS 38.214 V15.1.0 (2018-03), for example) should be understood to refer to the specific version(s) of such standard(s) that is(were) current at the time the present application was filed, and may also refer to applicable counterparts and successors of such versions.

The description herein focuses on a 3GPP cellular communications system and, as such, 3GPP terminology or terminology similar to 3GPP terminology is oftentimes used. However, the concepts disclosed herein are not limited to a 3GPP system.

FIG. 1 illustrates one example of a cellular communications network 100 in which embodiments of the present disclosure may be implemented. In the embodiments described herein, the cellular communications network 100 is a Public Land Mobility Network (PLMN) conforming to one or more of the LTE, 3G, 4G and 5G NR standards, or their successors. In the illustrated example, the cellular communications network 100 includes a (Radio) Access Network ((R)AN) 102 comprising base stations 104-1 and 104-2 controlling radio communications with wireless devices 106-1, 106-2, 106-3, 106-4,106-5 within corresponding macro cells 108-1 and 108-2. Each macro cell 108 may be defined by any suitable combination of geography, frequency, Radio Access Technology (RAT) and modulation scheme.

Base stations 104 can be any type of network access device capable of establishing radio connection(s) with one or more wireless devices 106 within a respective coverage area of the base station 104 or low power node 112, and further configured to forward subscriber traffic between the core network 114 and the one or more wireless devices 106. An important feature of a base station 104 is that it is configured with both a radio interface configured to send and receive radio signals to and from a wireless device 106, and a network interface configured to exchange electronic and/or optical signals with the core network 114. Examples of base stations 104 and low power nodes 112 include: Evolved Node B (eNB) systems (known, for example, in the 3GPP standards): WiFi access points (known, for example from IEEE 802.11 standards) or the like. In some contexts, a base station 104 may be referred to as an access point (AP) regardless of the Radio Access Technology (RAT) that it supports.

The illustrated (R)AN 102 also includes small cells 110-1 through 110-4, within which radio communication can be controlled by corresponding low power nodes 112-1 through 112-4. As with the macro cells 108, each small cell may be defined by any suitable combination of geography, frequency, Radio Access Technology (RAT) and modulation scheme. As with the base stations 104, a low power node 112 can be any type of network access device capable of establishing radio connection(s) with one or more wireless devices 106 within a respective coverage area of the low power node 112, and further configured to forward subscriber traffic between the core network 114 and the one or more wireless devices 106. An important feature of a low power node 112 is that it is configured with both a radio interface configured to send and receive radio signals to and from a wireless device 106, and a network interface configured to exchange electronic and/or optical signals with the core network 114. In some embodiments, a low power node 112 may be connected to the core network 114 by a direct connection, such as an optical cable. In other embodiments, a low power node 112 may be connected to the core network 114 by an indirect connection, such as via a radio or optical fiber link to a base station 104. Examples of low power nodes 112 include: Remote Radio Heads (RRHs) connected to a base station or a network router (not shown): WiFi access points or the like. In some contexts, a low power node 112 may be referred to as an access point (AP) regardless of the specific Radio Access Technology (RAT) that it supports.

Notably, while not illustrated, a particular small cell 110 may alternatively be controlled by a base station 104, for example using a beam-forming technique. In such cases, the particular small cell 110 will not be associated with a respective low power node 112 per se. Rather, the particular small cell 110 will be associated with a respective set of parameters implemented in the base station 104. In this disclosure, the term "cell" is used to refer to a defined combination of parameters (such as geography, frequency, Radio Access Technology (RAT), modulation scheme, identifiers and the like) that can be used by a wireless device 106 to access communication services of the network 100. The term "cell" does not imply any particular parameter values, or any particular physical configuration of devices needed to enable a wireless device 106 to access those communication services.

Wireless devices 106 can be any type of device capable of sending and receiving radio signals to and from a base station 104 and/or low power node 112. Examples of wireless device 106 include cellular phones, Personal Data Assistants (PDAs), mobile computers, Internet of Things (IoT) devices, autonomous vehicle controllers, and the like. In some contexts, a wireless device 106 may be referred to as a User Equipment (UE) or a mobile device.

In some embodiments, the macro cells 108-1 and 108-2 may overlap each other, and may also overlap one or more small cells 110. For example, a particular macro cell 108-1 may be one macro cell 108 among a plurality of macro cells covering a common geographical region and having a common RAT and modulation scheme, but using respective different frequencies and/or AP identifiers. In such cases, a wireless device 106 located within a region covered by two or more overlapping cells 108, 112 may send and receive radio signals to and from each of the corresponding base stations 104 and/or low power nodes 112.

In the illustrated example, the (R)AN 102 is connected to a Core Network (CN) 114, which may also be referred to as Evolved Core Network (ECN) or Evolved Packet Core (EPC). The CN 114 includes (or, equivalently, is connected to) one or more servers 116 configured to provide networking services such as, for example, Network Functions (NFs) described in 3GPP TS 23.501 V15.2.0 (2018-06) "System Architecture for the 5G System" and its successors. The CN 114 also includes one or more gateway (GW) nodes 118 configured to connect the CN 114 to a packet data network (DN) 120 such as, for example, the internet. A gateway node 118 may be referred to as a packet gateway (PGW) and/or a serving gateway (SGW). The DN 120 may provide communications services to support end-to-end communications between wireless devices 106 and one or more application servers (ASs) 122 configured to exchange data packet flows with the wireless devices 106 via the CN 114 and (R)AN 102. In some contexts, an application server (AS) 122 may also be referred to as a host server.

In some contexts, an end-to-end signal path between an AS 122 and one or more wireless devices 106 may be referred to as an Over-The-Top (OTT) connection. Similarly, a communication service that employs signal transmission between an AS 122 and one or more wireless devices 106 may be referred to as an OTT service.

It should be appreciated that the separation between the CN 114 and the DN 120 can be purely logical, in order to simplify understanding of their respective roles. In particular, the CN 114 is primarily focused on providing wireless device access services and supporting wireless device mobility. On the other hand, the DN 120 is primarily focused on providing end-to-end communications, particularly across network domains. However, it will be appreciated that both the CN 114 and the DN 120 can be implemented on common physical network infrastructure, if desired.

Figure 2A:
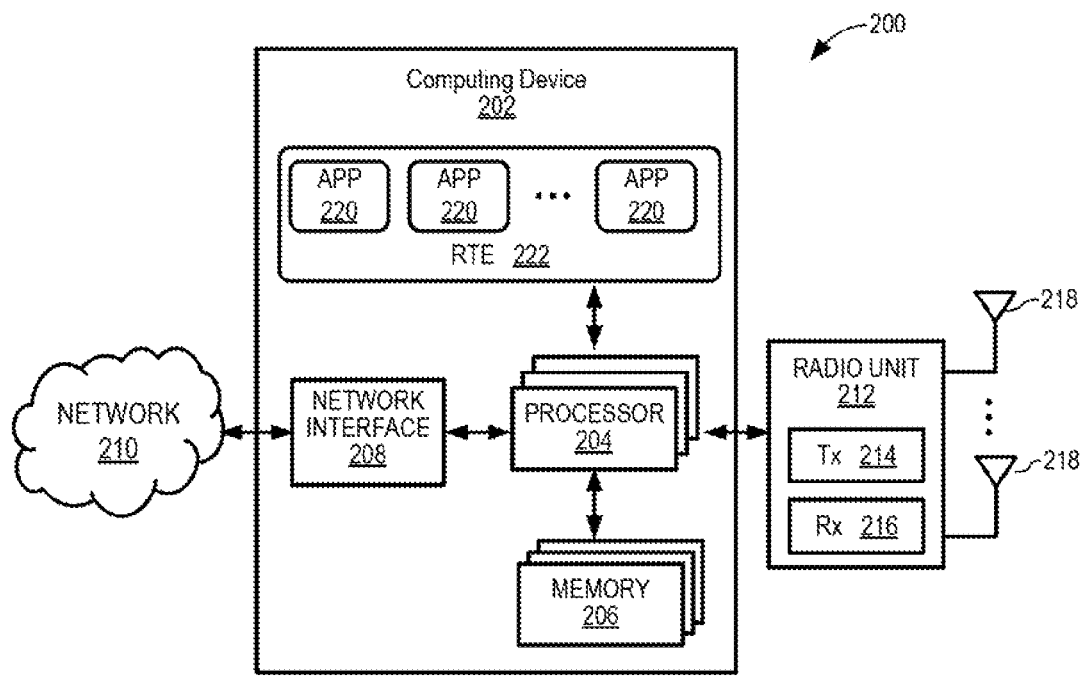
FIGS. 2A and 2B are block diagrams schematically illustrating examples of a computing device usable in embodiments of the present invention.
Figure 2B:
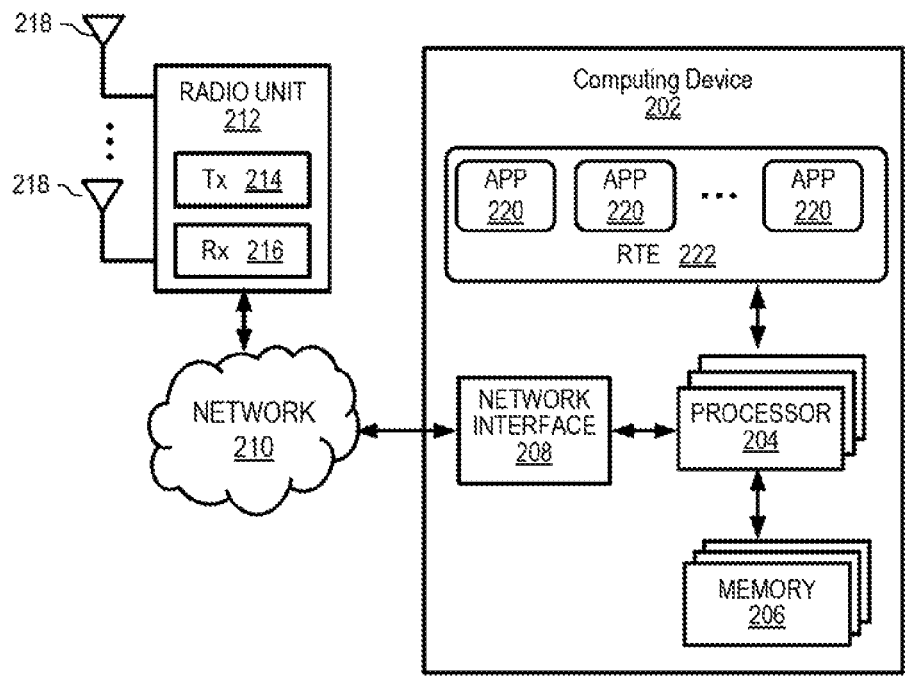

FIGS. 2A and 2B are block diagrams schematically illustrating a communications system 200 including a computing device 202 usable in embodiments of the present invention. In various embodiments, any or all of the base stations 104 or 112, wireless devices 106, core network servers 116 or gateways 118 and data network servers 122 may be implemented using systems and principles in accordance with the computing device 202. It may also be appreciated that any or all of the elements of the network 100 may be virtualized using techniques known in the art or developed in the future, in which case the functions of any or all the base stations 104 or 112, core network servers 116 or gateways 118, and/or any or all network functions of the network 100 may be implemented by suitable software executing within a computing device 202 or within a data center (non shown) composed of multiple computing devices 202.

In the example of FIG. 2A, the communications system 200 generally includes computing device 202 connected to one or more networks 210 and one or more radio units 212. The computing device 202 includes one or more processors 204, a memory 206, one or more network interfaces 208. The processors 204 may be provided as any suitable combination of Central Processing Units (CPUs), Application Specific Integrated Circuits (ASICs), Field Programmable Gate Arrays (FPGAs), or the like. Similarly, the memory 206 may be provided as any suitable combination of Random Access Memory (RAM), Read Only Memory (ROM) and mass storage technologies such as magnetic or optical disc storage or the like. The network interfaces 208 enable signaling between the computing device 200 and the networks 210, such as the Core Network 114, the data network 120, or a private domain network such as a data center (not shown).

Each radio unit 212 typically includes at least one transmitter (Tx) 214 and at least one receiver (Rx) 216 coupled to one or more antennas 218. In the example of FIG. 2A, the radio unit(s) 212 is(are) shown as being external to the computing device 202 and connected to the computing device 202 via a suitable physical connection (such as a copper cable or an optical cable). In the example of FIG. 2B, the radio unit(s) 212 is(are) shown as being connected to computing device 202 via a network 210 and a network interface 208. In still other embodiments, the radio unit(s) 212 and optionally also the antenna(s) 218 may be integrated together with the computing device 202.

The one or more processors 204 operate to provide functions of the computing device 202. Typically, these function(s) are implemented as software applications (APPs) 220 or modules that are stored in the memory 206, for example, and executed by the one or more processors 204. In some embodiments, one or more software applications or modules 220 may execute within a secure run-time environment (RTE) 222 maintained by an operating system (not shown) of the computing device 202.

It may be appreciated that specific embodiments may exclude one or more of the elements illustrated in FIGS. 2A and 2B. For example, a computing device 202 configured to implement a wireless device 106 may incorporate one or more processors 204, a memory 206, and one or more radio units 212, but may exclude a network interface 208. Conversely, a computing device 202 configured to implement a server 116 or 122 may include one or more processors 204, a memory 206, and one or more network interfaces 208, but may exclude radio units 212. A computing device 202 configured to implement a base station 104 or 112, on the other hand, will normally include one or more processors 204, a memory 206, and both radio units 212 and network interfaces 208.

Figure 3:
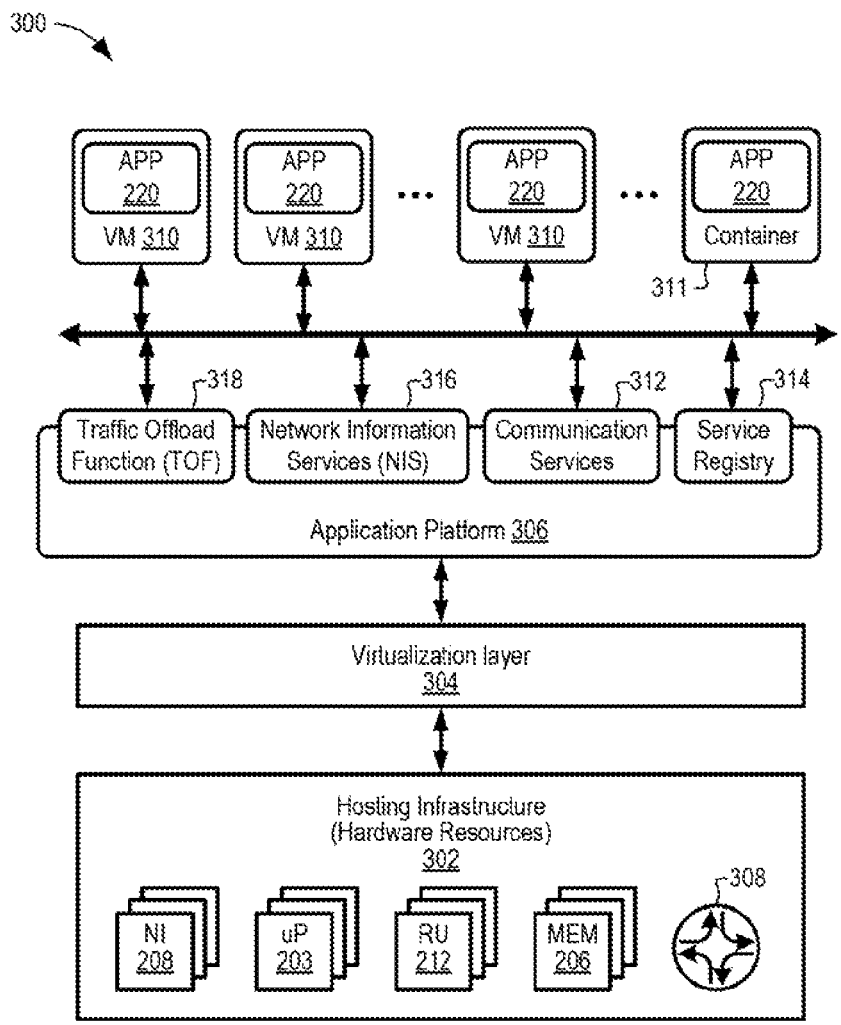
FIG. 3 is a block diagram schematically illustrating an architecture of a representative network element virtualization usable in embodiments of the present invention.

FIG. 3 is a block diagram schematically illustrating an example architecture for network element virtualization usable in embodiments of the present invention. It is contemplated that the network elements may be physically implemented using one or more computers, data storage devices and routers (any or all of which may be constructed in accordance with the system 200 described above with reference to FIG. 2) interconnected together and executing suitable software to perform its intended functions. Those of ordinary skill will recognize that there are many suitable combinations of hardware and software that may be used for this purpose, which are either known in the art or may be developed in the future. For this reason, a figure showing physical hardware components and connections is not included herein.

As maybe seen in FIG. 3, the illustrated architecture 300 generally comprises hosting infrastructure 302, a virtualization layer 304 and an Application Platform Services layer 306. The hosting infrastructure 302 comprises physical hardware resources provided by the infrastructure on which the architecture 300 is being implemented. These physical hardware resources may include any or all of the processors 204, memory 206, network interfaces 208 and radio units 212 described above with reference to FIG. 2, and may also include traffic forwarding and routing hardware 308. The virtualization layer 304 presents an abstraction of the hardware resources 302 to the Application Platform Services layer 306. The specific details of this abstraction will depend on the requirements of the applications 220 being hosted by the Application Platform Services layer 306. Thus, for example, an APP 220 that provides traffic forwarding functions may be presented with an abstraction of the hardware resources 306 (e.g. processor(s) 204, memory 206 and traffic forwarding hardware 308) that simplifies the implementation of traffic forwarding policies. Similarly, an application that provides data storage functions may be presented with an abstraction of the hardware resources 306 (e.g. processor(s) 204 and memory 206) that facilitates the storage and retrieval of data (for example using Lightweight Directory Access Protocol-LDAP).

The application platform 306 provides the capabilities for hosting applications. In some embodiments, the application platform 306 supports a flexible and efficient multi-tenancy run-time and hosting environment for applications 220 by providing Infrastructure as a Service (IaaS) facilities. In operation, the application platform 306 may provide a security and resource "sandbox" for each application 220 being hosted by the platform 306. Each "sandbox" may be implemented as a Virtual Machine (VM) image 310 that may include an appropriate operating system and controlled access to (virtualized) hardware resources 302. Alternatively, each "sandbox" may be implemented as a container 311 that may include appropriate virtual memory and controlled access to host operating system and (virtualized) hardware resources 302. The application platform 306 may also provide a set of middleware application services and infrastructure services to the applications 220 hosted on the application platform 306, as will be described in greater detail below.

Applications 220 from vendors, service providers, and third-parties may be deployed and executed within a respective Virtual Machine 310. For example, PCF 220 may be implemented by means of one or more applications 220 hosted on the application platform 306 as described above. Communication between applications 220 and services of the application platform 306 may conveniently be designed according to the principles of Service-Oriented Architecture (SOA) known in the art.

Communication services 312 may allow applications 220 to communicate with the application platform 306 (through pre-defined Application Programming Interfaces (APIs) for example) and with each other (for example through a service-specific API).

A Service registry 314 may provide visibility of the services available on the server. In addition, the service registry 314 may present service availability (e.g. status of the service) together with the related interfaces and versions. This may be used by applications 220 to discover and locate the end-points for the services they require, and to publish their own service end-point for other applications to use.

Network Information Services (NIS) 316 may provide applications 220 with low-level network information pertaining to a network service instance or one or more PDU sessions, for example. For example, the information provided by NIS 316 may be used by an application 220 to calculate and present relevant data (such as: cell-ID, location of the subscriber, cell load and throughput guidance) to session, access and policy control functions of the network 100, any or all of which may themselves to implemented by applications 220 executing in respective VMs 310 or containers 311.

A Traffic Off-Load Function (TOF) service 318 may prioritize traffic, and route selected, policy-based, data streams to and from applications 220.

Systems and methods are disclosed herein that provide Some embodiments, referred to as "UL CoMP TDoA," use Uplink Coordinated Multi-Point (UL CoMP) reception, which is an important base station (eNB/gNB) feature used to improve UL signal to noise ratio (SNR) for WDs located at cell coverage limits or experiencing interference from other cells. Some embodiments use UL coordination to combine receptions from different network node radios to improve SNR.

Conventional UL-COMP feature implementations involve receiving signals from a WD using a plurality of antennas in at least two different sectors, thereby using receive spatial diversity and signal combining to improve received power from the WD. To increase throughput, co-operating cells may be selected based on UL received signal power and/or UL received SNR.

According to the principles described herein, UL-CoMP TDoA may involve receiving signals from a WD using a plurality of antennas in at least three different sectors, thereby using trilateration calculations of calculated TDoA to improve root mean square (RMS) error. While UL-CoMP cooperating cell selection is based on the highest WD measured RSRP (power) result, UL-CoMP-TDoA cooperating cell selection is designed to reduce/minimize the root mean squared positioning error, which is a function of UL SNR and geometry. In short, UL-COMP TDoA works to maximize the orthogonality of hyperbolic curves, thereby minimizing the dilution of precision of the trilateration calculations as compared with other solutions.

The narrow band Internet of things (NB-IoT) was designed to achieve a 20 dB coverage enhancement over Global System for Mobile communications (GSM). NB-IoT devices may also be constrained by costs and battery charge life, and be configured to transmit at +23 dBm, which is 10 dB lower than GSM. Channel retransmission repetition was then introduced to achieve the desired uplink budgets. To this end, a new information element may be defined as follows.

| MOC | New Attributes | Description | Range | E/// Default |
|---|---|---|---|---|
| ENodeBFunction | maxNrOfInterEnbUICompLbm | Max number of inter-eNodeB UL CoMP candidate LBMs for each serving or cooperating LBM. | 0 . . . 10 | 6 |

Figure 4A:
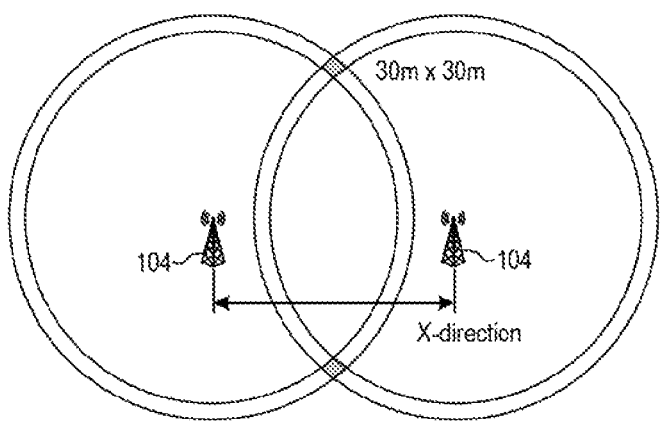
FIGS. 4A and 4B illustrate dilution of precision in an example deployment of two radio nodes.
Figure 4B:
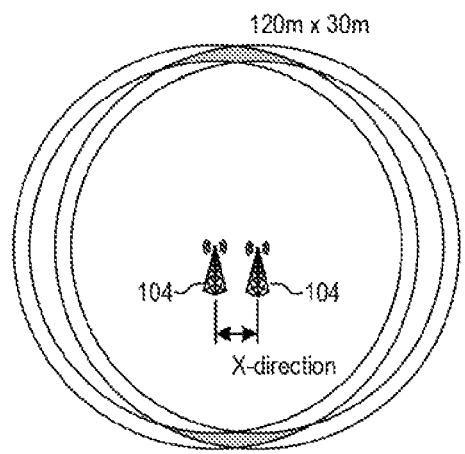

How geometry affects dilution of precision (DOP) is explained. When a network node 104, 112 radio and/or radio unit 212, such as an eNB radio, calculates TDoA, its measurements have an uncertainty, which in this example is ±1.5 Ts, yielding a positioning error of 30 m×30 m. Therefore, with two TDoA measurements, the WD position is determined to be one of two locations, each with a precision of ±15 m, as shown in the image of FIG. 4A. In FIG. 4B, the network node radios are closely co-located and even though they have the same TDoA measurement error of ±1.5 Ts, they have an X-direction DOP of 4, from ±15 to ±60 m.

Dilution of precision can therefore be thought of as the ratio of error in output location to error in measured data. A ratio of 1 indicates that there is no multiplication of measurement errors. DOP has not conventionally been a requirement of current UL CoMP measurements. These measurements are currently only concerned with WD UL signal to interference plus noise ratio (SINR), the recovery of data streams, and enhancing UL performance.

Figure 5A:
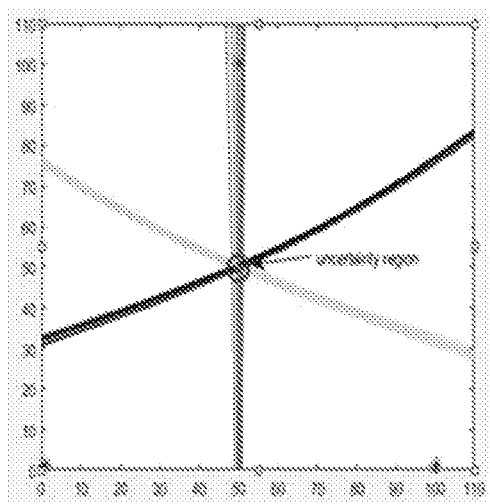
FIGS. 5A and 5B illustrate dilution of precision in an example deployment of three radio nodes.
Figure 5B:
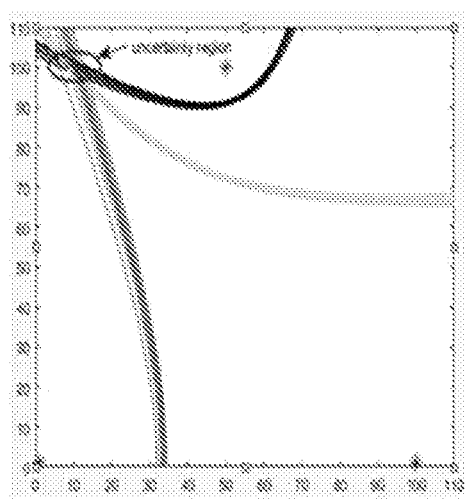

A second example is useful in understanding this concept. In FIGS. 5A and 5B, two example cases are shown in which three network nodes are deployed. In the plot of FIG. 5A, the WD is located near a centroid region of the geometry of the nodes. Three sets of hyperbola lines are shown. These lines are hyperbola trajectories of time difference of arrival (TDoA) measurements between network node pairs. A point of intersection of these lines is the possible WD location. But as can be seen in the plot of FIG. 5B, in the presence of noise in the measurements, there are multiple possible trajectories for WD locations for every TDoA measurement. The WD location at the intersection of TDoA trajectories does not remain unique. As shown in FIG. 5B, the WD location lies in the uncertainty region which includes all possible WD locations. It is seen that the uncertainty region in the plot of FIG. 5B is larger than the one in the FIG. 5A. This is due to the location specific sensitivity of error in position estimation of a WD. This effect is called geometric dilution of precision in position estimation.

Some solutions have an advantage of mitigating IoT device discretization measurement errors in Category M1 and Category NB1 WDs which employ low sample rate receivers. Some embodiments use every UL measurement report from the IoT WD as a positioning opportunity. Assuming all WD transmissions have low time correlation over durations up to tens of microseconds, the extracted WD orthogonal frequency division multiplex (OFDM) transmission data in the time-domain may be used as a reference signal. Some embodiments also conserve WD battery power.

Some embodiments rely on network node UL oversampling of WD IoT transmissions to improve measurement accuracy. While downlink (DL) OTDoA signals are sampled at 16 Ts at the WD or as low as 96 Ts for Category NB1 devices, the base station (i.e., network node) UL sampling rate is 1 Ts=1/30.72 MHz=32.5 ns. This faster sampling rate enables greater observability of the WD UL signal, and provides visibility of the fastest line of sight signal.

Some embodiments eliminate or reduce uncertainties in the WD crystal tolerances and measurement inaccuracies. The base station clocks are generally high precision TCVCXO crystals with typical frequency stabilities in the parts-per-trillion range. Since all base station measurements may be made on the same uplink WD transmission, the only errors in the measurement are caused by antenna reference point (ARP) time alignment errors (TAE) which can be eliminated or reduced below 10 ns using other technologies such as Radio Inter Base Station Synchronization Monitoring (RIBM).

Some embodiments employ network level algorithms, are independent of the type of IoT device, and are not adversely affected by the IoT device filtering algorithms. Note that IoT device transmissions may be well defined and consistent. The message content may change but this does not affect the positioning accuracy of some embodiments.

Some embodiments work well even with low signal to noise ratios. Some embodiments, treat the IoT WD UL transmissions as "virtual" reference signals and achieve a high processing gain. For example:

Category M1 signals have a peak bit rate of 0.8/1 Mbps (300/375 kbps). A 250-byte (2000-bits) measurement report transmitted at 375 kbps takes 5.3 ms or roughly 80 symbols of 66.7 μs. Following International Telecommunications Union (ITU) REC M1225, the root mean square (RMS) dispersions for environments of indoor pedestrian, outdoor-to-indoor pedestrian, and outdoor-to-outdoor vehicular are 100 ns, 750 ns, and 4000 ns respectively. A TDoA correlation process derives the channel impulse response, with effective processing gains of 47 dB for indoor pedestrian environments, 38 dB for outdoor to indoor pedestrian environments, and 31 dB for outdoor to outdoor vehicular environments under ideal correlation.

For NB-IoT with a peak bit rate of 227/250 kbps (21/63 kbps), the same 250-byte measurement message is now transmitted at a peak rate of 63 kbps, and has similar processing gains, offset by the narrower bandwidth of the signal by increasing the time correlation.

EC-GSM-IoT signals are also possible, but not discussed further in this disclosure.

Some embodiments improve IoT WD battery life as compared with known solutions by using processing gains of CoMP, so that not as many uplink transmissions are needed to determine position.

Thus, in some embodiments, a reference signal received at a hosting network node from a WD is cross-correlated with signals received from the WD at other cooperating network nodes to determine a time difference of arrival of the WD, from which position can be determined.

Figure 6:
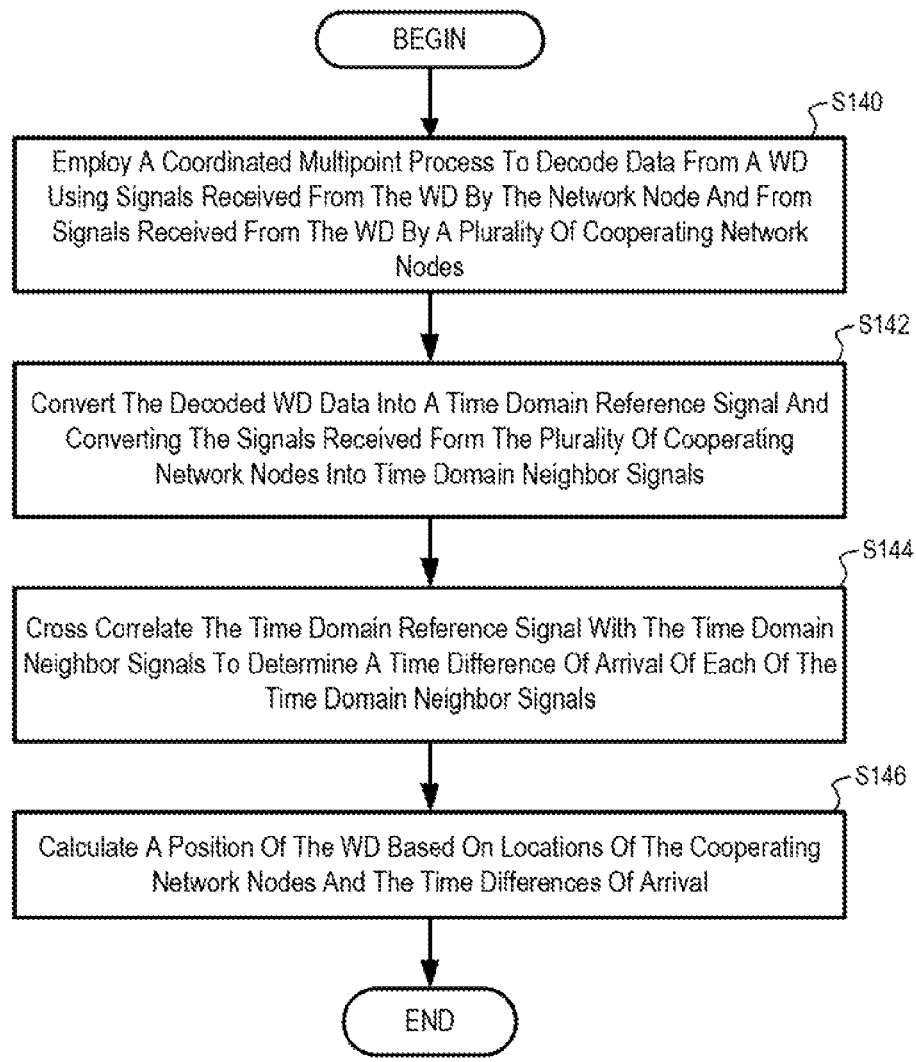
FIG. 6 is a flowchart showing an example process in a network node for uplink coordinated multipoint position determination.

FIG. 6 is a flowchart of an example process performed by a network node 104, 112 for uplink coordinated multipoint positioning in accordance with the principles of the present disclosure. One or more blocks described herein may be performed by one or more elements of network node 104, 112 such as by one or more processor 204, radio unit 212 and/or network interface 208. Before determining a WD position using the methods described herein, the network node 104, 112 such as via processor 204 and/or radio unit 212 and/or network interface 208 may be configured to optionally make an initial determination of position according to known methods. For example, the network node 104, 112 may optionally send a measurement report request and receive measurement reports from the WDs. The network node 104, 112 may optionally estimate WD 106 location using a conventional, i.e., known method, such as trilateration based on RSRP. The process may also optionally include selecting neighboring network nodes to be used as cooperating network nodes based on the estimated WD 106 location and geodetic data of the neighboring network nodes 104, 112.

The process may employ a coordinated multipoint process to decode data from a WD 106 using signals received from the WD 106 by the network node and from signals received from the WD 106 by a plurality of cooperative network nodes 104, 112 (Block S140). Reference to a coordinated multipoint process refers to utilizing the CoMP processing mode of the network node. In some embodiments, the network node may be configured or is already configured for CoMP (joint) processing of signals received at cooperating network nodes from the WD with the signal received at the hosting network node from the WD to produce a final output signal. This joint processing may be taken further to determine WD position. Thus, the process may also convert the decoded WD 106 data signal into a time domain reference signal and convert the signals received from the plurality of cooperative network nodes into time domain neighbor signals (Block S142). The process also may include cross-correlating the time domain reference signal with the time domain neighbor signals to determine a time difference of arrival for each of the plurality of time domain neighbor signals (Block S144). The process further includes calculating a position of the WD 106 based on the time differences of arrival and based on locations of the cooperative network nodes (Block S146).

Figure 7:
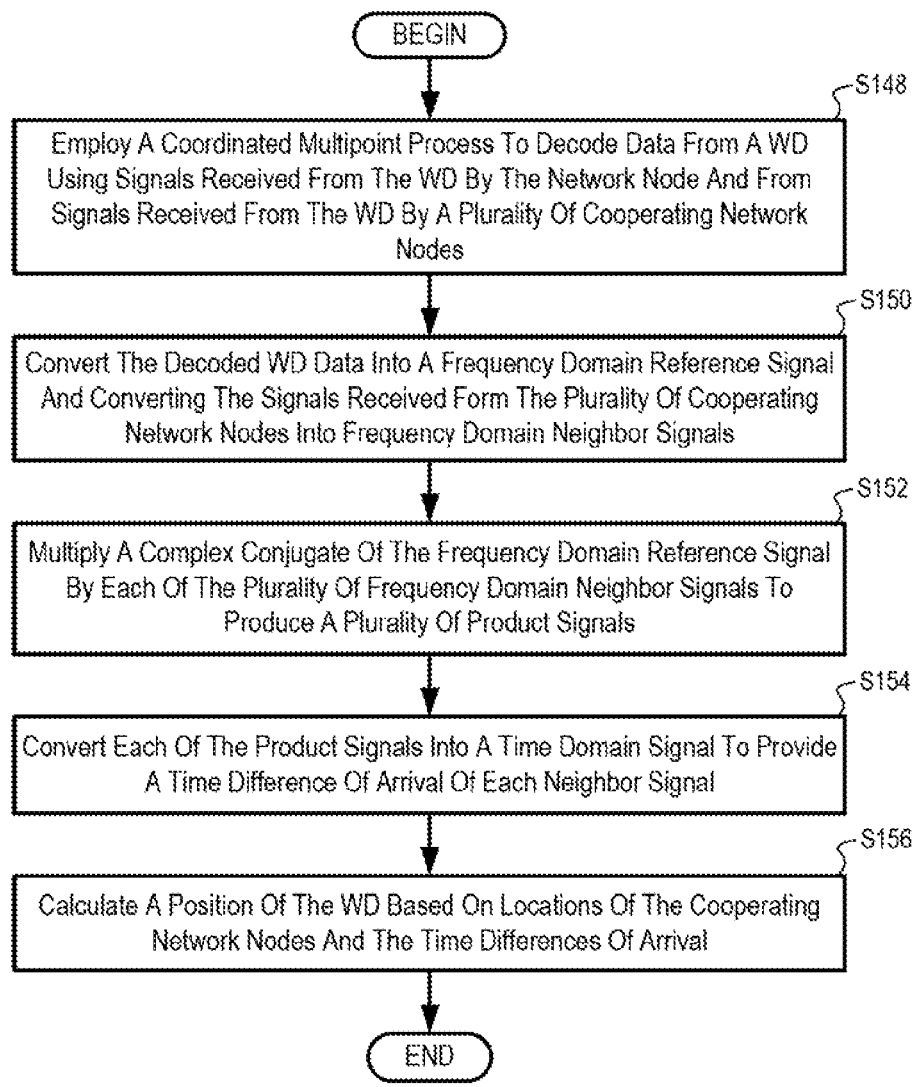
FIG. 7 is a flowchart showing an alternative example process in a network node for uplink coordinated multipoint position determination.

FIG. 7 is a flowchart of an alternative example process performed in a network node 104, 112 for performing uplink coordinated multipoint positioning in accordance with the principles of the present disclosure. One or more Blocks described herein may be performed by one or more elements of network node 104, 112 such as by one or more of processing circuitry 68 (including the position determination unit 32), processor 204, radio unit 212 and/or network interface 208. Network node 104, 112 such as via processing circuitry 68 and/or processor 204 and/or radio unit 212 and/or network interface 208 is configured to employ a multipoint function to decode data from a WD 106 using signals received from the WD 106 by the network node and from signals received from the WD 106 by a plurality of cooperative network nodes (Block S148). The network node 104, 112 converts the decoded WD data into a frequency domain reference signal and converting the signals received from the plurality of cooperative network nodes into frequency domain neighbor signals (Block S150). The process further includes multiplying a complex conjugate of the frequency domain reference signal by each of the plurality of frequency domain neighbor signals to produce a plurality of product signals (Block S152). The process also includes converting each of the product signals into a time domain signal to provide a time difference of arrival of each frequency domain neighbor signal (Block S154). The network node 104, 112 then calculates a position of the WD 106 based on the time differences of arrival and based on locations of the cooperative network nodes (Block S156).

Before determining a WD position using the methods described with reference to FIG. 7, the network node 104, 112 such as via processor 204 and/or radio unit 212 and/or network interface 208 may be configured to optionally make an initial determination of position according to known methods. In some embodiments according to the aspect described with reference to FIG. 7, the network node 104, 112 may optionally send a measurement report request and receive measurement reports from the WDs. The network node 104, 112 may optionally estimate WD 106 location using a conventional, i.e., known method, such as trilateration based on RSRP. The process may also optionally include selecting neighboring network nodes to be used as cooperating network nodes based on the estimated WD 106 location and geodetic data of the neighboring network nodes 104, 112.

In some embodiments, the network node 104, 112 is further configured to provide a reportConfigEUTRA WD measurement report with a negative A3-Offset greater than 19. In some embodiments, the network node 104, 112 is further configured to perform geometric dilution of precision calculations to select a set of cooperative network nodes 104, 112 for use in positioning calculations. In some embodiments, the network node 104, 112 is further configured to bind a channel impulse response in the time domain using a calculated channel impulse response of a demodulation reference signal, DMRS, symbol from at least one of the plurality of time domain neighbor signals. In some embodiments, the network node 104, 112 is further configured to use a reference signal transmitted by the WD 106 in every resource block to confirm a channel impulse response calculated from the cross correlation. In some embodiments, a reference signal is selected from signals received from the WD by the network node as a signal having a signal to noise ratio, SNR, of at least 10 dB. In some embodiments, the network node 104, 112 is further configured to use trilateration based on reference signal received power, RSRP, to provide an initial estimate of WD 106 location followed by subsequent iterations based on cross correlation of the time domain reference signal with the time domain neighbor signals. In some embodiments, the network node is located remote from the cooperating network nodes and wherein positions of WDs are determined at the remote location. In some embodiments, the received signals are transmitted over a full transmission time interval, TTI, consisting of 14 symbols.

Having described the general process flow of arrangements of the disclosure and having provided examples of hardware and software arrangements for implementing the processes and functions of the disclosure, the sections below provide details and examples of arrangements for uplink (UL) coordinated multipoint (CoMP) positioning.

Some embodiments take advantage of the time domain orthogonality of OFDM signals to use WD UL transmissions in lieu of a reference signal, such as a 3GPP position reference signal (PRS), to accurately measure UL TDoA and extract channel characteristics of multipath delay.

OFDM signals are created from digital data that is mapped onto N-parallel subcarriers, and then converted into the time domain using an inverse fast Fourier transform (IFFT) into an OFDM symbol $O_k$.

$$O_k = \sum_{n=0}^{N-1} d_n e^{\frac{j2\pi kn}{N}}$$

In the equation above, $d_n$ is the data symbol on the n-th sub-carrier and $O_k$ is the N-point IFFT of the signal.

OFDM subcarrier frequencies are selected to be orthogonal, where the average value over time T of the multiplication of two signals is zero.

$$\frac{1}{T}\int_0^T x(t)y(t)dt = 0$$

This property ensures that the time domain symbol is uncorrelated over the duration T, enabling received OFDM signals to be used as an alternate to reference signals.

Positioning reference signals r(n) are known in advance of their transmission and therefore can be used to calculate the time difference of arrival of all WD 106 signals u(n). Calculation by the position determination unit 32 may be performed by correlating the known PRS against each received signal, with the output yielding the channel impulse response function h(n) shown in the figure below for an ITU REC M.1225 Indoor-B multipath channel model.

$$h(n) = \sum_{m=0}^{m=N} r(m)u(n-m)$$

Figure 8:
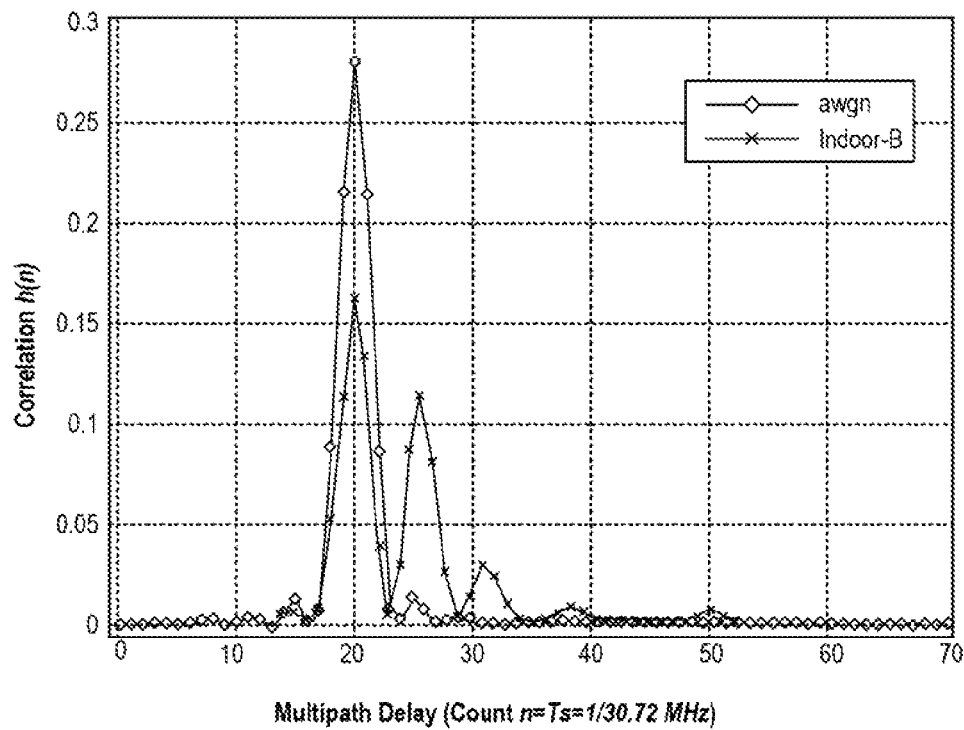
FIG. 8 is a graph showing an example channel impulse response.

A graph of this function is shown in FIG. 8 where AWGN is additive white Gaussian noise.

In the case of WD UL transmissions, the reference signal should first be recovered, and for IoT devices with low transmit power and stretched link budgets, the WD 106 may be required to make multiple transmissions before the data can be recovered.

Some embodiments address the complexities of signal reception and data recovery, while reducing dilution of precision and achieving a signal that is long enough for use as a reference signal.

Simulations show the complexities of using data signals as reference signals to measure the channel impulse response function h(n) under conditions of low and high SNR for the reference signal and for the received signals at the various antennas.

These simulations use an additive white Gaussian noise (AWGN) channel with: no delay; 2048 FFT size, 15 kHz tone spacings, normal LTE CP, and random quadrature phase shift keying (QPSK) modulation on all allocated subcarriers. NB-IoT signals use $\pi/4$ QPSK for single subcarrier which is a phase shift of $\pi/4$ every OFDM symbol.

Single Carrier NB-IoT Simulations:

Simulations of a Single Carrier NB-IoT network show that the NB-IoT data signal from a WD 106 should only be used as a reference signal for purposes of determining the channel impulse model when the reference signal is noise free. If the reference signal, Rx1, and comparative data from a second antenna, Rx2, both have high 0 dB SNR, then the graph of FIG. 9C shows there is no visible channel impulse response by which positioning measurements can be obtained. However, when the reference is "noise free" as shown in the graphs of FIGS. 9A and 9B, a channel impulse is readily visible.

This alludes to a feature of some embodiments, which is to use demodulated WD UL NB-IoT data as a reference signal.

Simulations of NB-IoT Single Subcarrier networks conducted over UL transmission durations of 500 μs to 50 ms where the number of OFDM symbols (Nsym) ranges from 50×14 (50 ms), to 500×14 (500 ms) and to 5000×14 (5 s) show very good channel impulse responses which can be used to estimate the TDoA, as can be seen in FIGS. 10A and 10B. Note the difference in horizontal scale and vertical scale for the graphs, where the graph of FIG. 10B is a magnification of a central portion of the graph of FIG. 10A.

Note that a 500 ms NB-IoT Single Carrier UL transmission represents a data transmission of 1750-bytes, just slightly longer than a typical 1500-byte Internet protocol (IP) packet commonly transmitted in the Internet. The simulation case of 5 s simply represents the aggregation of 10 such transmissions.

Also note that the SNR for the comparative antennas Rx2 is set at 15.0 dB, which is the typical low end of most WD UL Single Carrier NB-IoT transmissions received by a network node 104, 112. For reference, this SNR represents a signal level 15.0 dB above the thermal noise floor at −132 dBm, or −117 dBm. In general, the network node 104, 112 may use power control to set the Single Carrier NB-IoT to be higher than this value, by 14 dB or more as the pZero-Threshold for a PRB is typically set at −103 dBm for a microcell.

These simulations prove that not only can a Single Carrier NB-IoT signal be correlated against its demodulated data signal, but the solution works with many decibels of margin, allowing for nearby "Rx2" antennas to be included in the correlation process, with received signal levels which are at least 14 dB below the signal received at the host network node 104, 112.

Note that Single Carrier NB-IoT WDs 22 are rated to operate with at least +14 dBm transmit power. The coupling loss for these devices to viably use the signals for time correlation is at least 128 dB, representing 1000 m plus 28 dB of wall losses.

Single PRB NB-IoT Simulations:

In one simulation, the NB-IoT devices have a bandwidth of one physical resource block (PRB) or 180 kHz. Such devices are commonly deployed. Simulations of single PRB NB-IoT show poor correlation when reference and comparison signals have low SNR, as can be seen in FIG. 11. In this case, data should not be used as reference signals to calculate channel impulse responses.

However, correctly demodulated Single PRB NB-IoT data signals, which are noise free, can be used as reference signals to calculate channel impulse responses. Simulations shown in FIGS. 12A and 12B show very good cross correlation of the noise free signal against a +15 dB Rx2 signal received from a different antenna.

These simulations support a hypothesis that uses demodulated WD UL NB-IoT data as a reference signal.

Cat M1 (6 PRB) NB-IoT Simulations:

Some NB-IoT devices have bandwidth being six PRBs or 1080 kHz and are quite commonly deployed. Simulations of six PRB NB-IoT, as shown in FIG. 13, exhibit some correlation when both the reference signal (Rx1) and the compared antenna (Rx2) are noisy with 0 dB SNR. However, it is not sufficient for reliable positioning.

Figure 14:
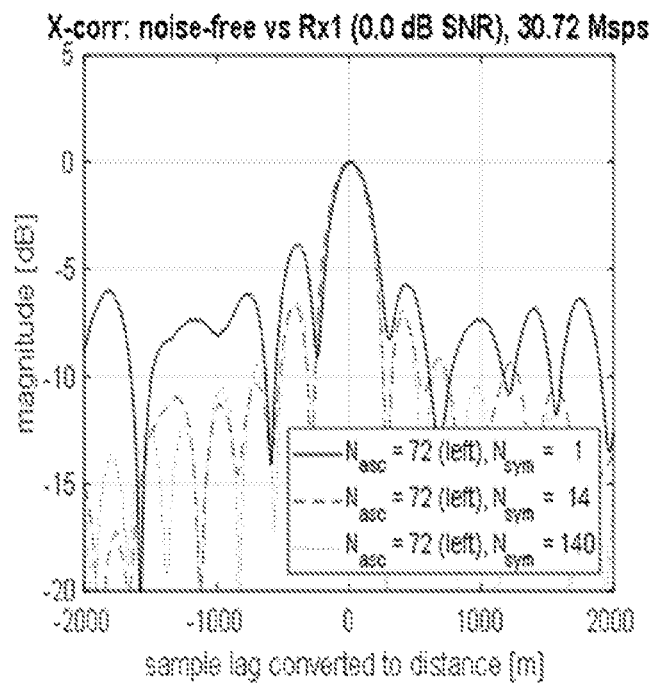
FIG. 14 shows a graph of channel impulse response computed using a noise free reference signal and the compared antenna signal has low SNR.

In contrast, using the demodulated "noise free" data signal as the reference signal, the cross-correlation becomes quite discernable, as shown in FIG. 14. Thus, this cross-correlation is useable as a means to estimate the channel model, even with a comparative antenna signal, in this case Rx1, having a high interference level of 0 dB SNR.

Figure 15:
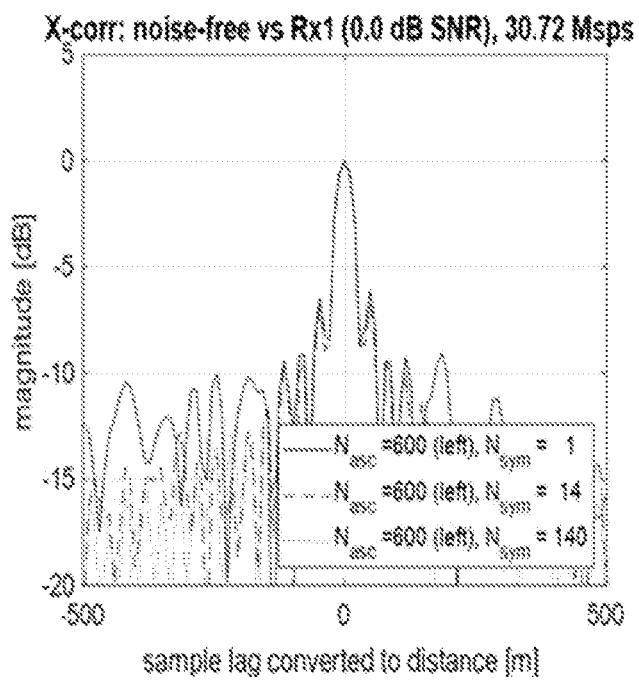
FIG. 15 shows a graph of channel impulse response computed using LTE signals when the reference signal is noise free.

Long Term Evolution (LTE) (50 PRB) Simulations:

This simulation represents using the data from a 10 MHz LTE channel, as the reference signal when performing cross-correlations against other antennas (Rx1). In this case, as shown in FIG. 15, the cross-correlation is good even for single symbols, with a SNR as high as 0 dB. As in the previous simulations, the reference signal may be the correctly demodulated signal, which is "noise free".

In summary, these simulations demonstrate aspects of some embodiments. Correctly demodulated data signals can be used as the reference signal when cross correlation is used to estimate the channel impulse response. The methodologies and arrangements described herein can be used for all 4G/5G OFDM signals including Single Carrier NB-IoT, Single PRB NB IoT, CAT M1 NB-IoT, and Long Term Evolution (LTE). Longer integration windows are needed for narrower band signals, and short single symbol correlations can be used with wider band CAT M1 and LTE signals.

Some implementations of the methods described herein may provide significant margin as compared with known solutions, thereby allowing positioning to be performed based on signals from a set of antennas which are located near the intended WD 106, but may see WD 106 signal levels 15 dB below the hosting network node 104, 112.

The methods for determining position described above may be hosted by the network node 104, 112 to which the NB-IoT WD 106 is attached, (i.e., the hosting network node 104, 112), and rely on measurements made by the hosting network node 104, 112 and cooperating network nodes 104, 112 (i.e., other base stations). UL CoMP algorithms work to maximize SNR to improve throughput as compared with known solutions, reducing WD 106 transmission time, consequently improving battery life and optimizing spectrum usage. In conventional UL CoMP the signals received from the WD 106 by the cooperating network nodes are jointly processed with the signal received from the WD 106 at the hosting network node 104, 112 to produce a final output signal with greater accuracy than using the signal received from the WD 106 by the hosting network node 104, 112 alone.

The UL CoMP TDoA algorithm may combine these goals with the further goal of accurately locating the WD. As such, the criteria for selecting cooperating network nodes 104, 112 may act to minimize positioning error, which is a function of the measured UL SNR from each network node 104, 112, including the impact of geometric dilution of precision. In UL CoMP TDoA, the joint processing of signals received from the cooperating network nodes includes correlating these signals with the signal received from the WD 106 at the hosting network node 104, 112 to determine TDoA and position. It will be understood from this disclosure that a noise free signal used for the correlation may be obtained by demodulation of the received signal prior to the correlation.

Figure 16A:
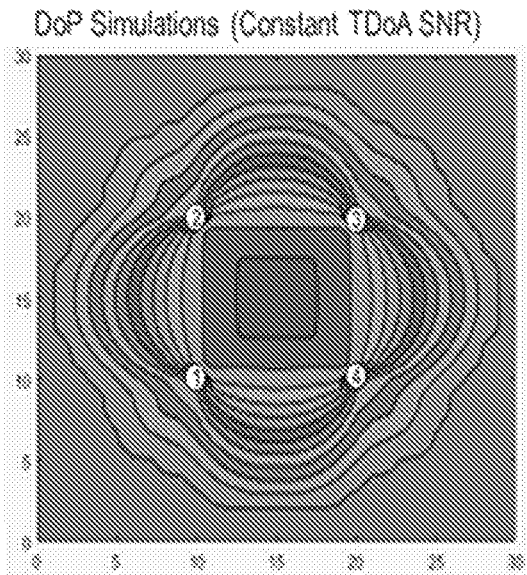
FIGS. 16A and 16B compares plots of four anchor points used for trilateration when different SNRs are present.
Figure 16B:
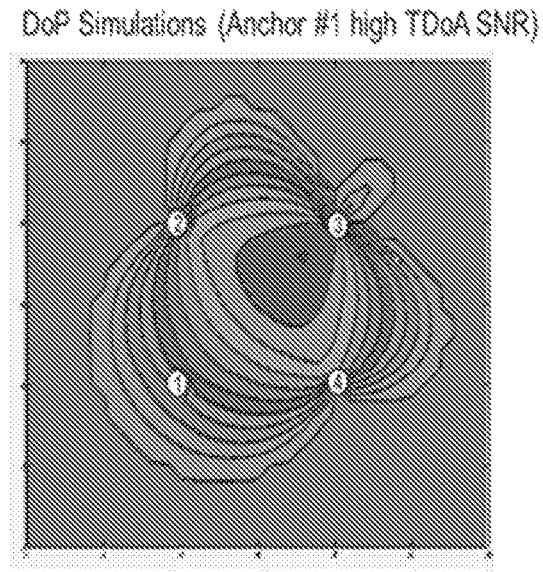

The plots of FIGS. 16A and 16B show respective examples in which four anchor points (such as base stations 104, 112 and/or radio units 212, for example) are used for trilateration in a 30 m×30 m area. In the plot of FIG. 16A, SNR is calculated as line of sight signal power over the −174 dBm/Hz thermal noise floor, and is the same for all anchor points, yielding a geometric symmetry in the calculated trilateration error. In the plot of FIG. 16B, the SNR of anchor #1 in the lower left corner has been artificially increased, resulting in an asymmetric error in the calculated trilateration error. This figure shows how an increase in TDoA SNR impacts the measurement accuracy over the area of interest.

Figure 17A:
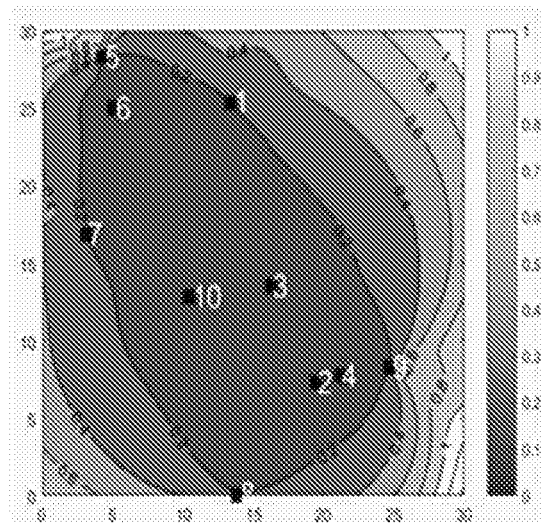
FIGS. 17A and 17B shows two simulation plots.
Figure 17B:
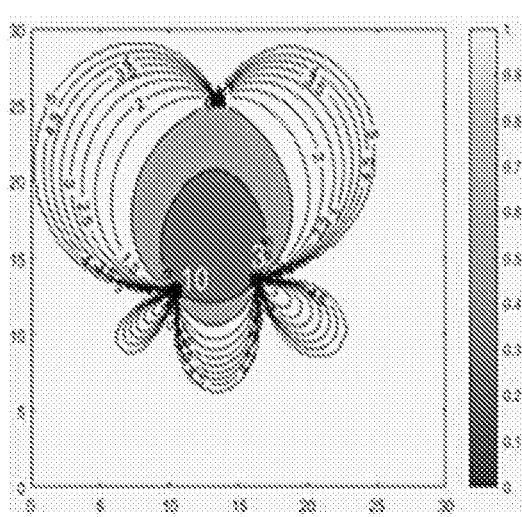

FIGS. 17A and 17B shows plots of two simulations.

Since UL CoMP focuses on maximizing SNR, while UL CoMP TDoA focuses on maximizing SNR and minimizing geometric trilateration errors causing dilution of precision, measurement reports requested from the WD 106 in each case are different.

Both UL CoMP and UL CoMP TDoA may rely on A3-measurement reports differing in at least one aspect. UL CoMP uses a typical A3-Offset ≤6 dB as defined within reportConfigEUTRA of TS36.331 to limit the cooperating network node 104, 112 radios to those with sufficient power to positively improve the SNR of the hosting network node 104, 112. A much larger A3-Offset value may be used for UL CoMP TDoA.

An A3-Offset may have an integer value between −30 and 30, calculated as (A3-Offset*0.5) dB. Typical UL CoMP uses a setting of −6 to establish a −3 dB offset so that all reported base station radios within 3 dB of the hosting network node 104, 112 are included. This may ensure that inclusion of their cooperative signals will achieve at least a 0.76 dB RSRP improvement, but more typically higher. If the A3-Offset was set to −30, representing a −15 dB offset, then the relative contribution of the cooperating network nodes 104, 112 would be a negligible increase of 0.01 dB. An A3-Offset value of −20 representing a −10 dB offset would yield a 0.04 dB power increase for a negligible SNR improvement.

Comparing the respective plots of FIGS. 17A and 17B, UL CoMP TDoA positioning may be less affected by SNR since the TDoA correlator function of the position determination unit 32 may achieve processing gains of 30 dB or more, and may achieve nanosecond accurate interpolated measurements even from weak NB-IoT signals. The UL CoMP TDoA feature would typically operate with an A3-Offset set to −30, representing a −15 dB offset. This may increase the number of reported network node measurements, including those with low SNR, some of which can significantly reduce the dilution of precision of the trilateration calculation.

While a first selection criterion often selects co-sited cooperative network nodes 104, 112, with overlapping cell coverage and good SINR, a second selection criterion may be based on the calculated TDoA root mean square (RMS) error, coupled with the (x, y, z) locations of the cell sites, to minimize trilateration calculation precision errors.

Furthermore, calculation of TDoA RMS error can tolerate much lower signal to interference plus noise ratio (SINR) than required for data demodulation. While data demodulation may require −2 dB SINR, TDoA calculations may tolerate −20 dB SINR before RMS errors may increase exponentially. This provides greater flexibility to select cooperative network nodes 104, 112 whose TDoA data can minimize trilateration calculations of the WD's location.

A network node 104, 112 or other node, may be implemented as or including a location server that performs some or all of the positioning functions described herein, such as the positioning functions of position determination unit 32. The location server may be cloud based, distributed, or located with the hosting network node 104, 112 radio. In some embodiments, the location server is a network node 104, 112 that does not include the radio or radio functionality, and may provide other network services. A method of selecting cooperating network node radio elements for WD/IoT positioning is as follows:

A network node 104, 112 serving as the location server may have the following information:
  The location of all other network node 104, 112 (eNodeB/gNodeB) radios;
  Path loss or channel inclusive geometric dilution of precision (GDoP) of the region of interest; and
  Requirements on the accuracy of position estimation, which corresponds to a maximum allowed GDoP value.

The WD 106 may transmit an uplink signal as a combination of data and reference signals that is received by multiple network nodes 104, 112. The Host/Serving network node 104, 112 radio may be time synchronized with the cooperating network node 104, 112 radios.

From the uplink time difference of arrival (UTDoA) measurements of the received signal from the WD 106, the network node 104, 112 serving as the location server may compute the position of the WD 106 and treat it as the initial position of the WD 106.

The network node 104, 112 serving as the location server may then find a set of other network nodes 104, 112 which would give a reasonably acceptable positioning performance for the considered WD 106. The geometric dilution of precision (GDoP) of the position of the considered WD 106 may be below the acceptable value.

The hosting network node 104, 112 with connected IoT WD 106 may also be in communication with a neighboring network node 104, 112 that helps with the demodulation of the inter-network node UL-CoMP data using conventional coordinated multipoint techniques.

GDoP calculations are attached hereto as APPENDIX A.

Some embodiments may allow for automatic configuration of time and frequency integration (summation) components. If the desired signal is a CAT-M1 signal, then the antenna signal summing may be integrated over the frequency span of FFirst to FLast where the covered bandwidth is 6 RB or 1.08 MHz. In time, this signal may be integrated over the data window signal which would be defined from a "First Data Symbol" to a "Last Data Symbol" as shown in FIG. 18.

Figure 18:
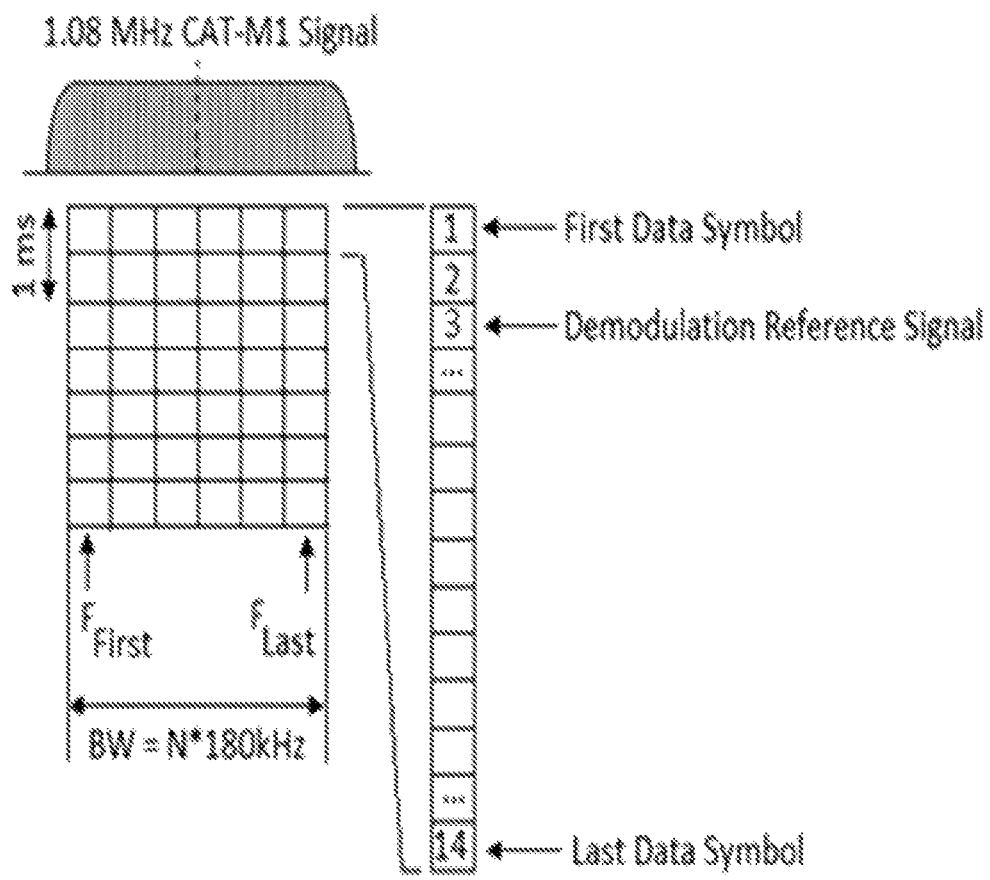
FIG. 18 illustrates reference symbol locations to be used to limit a correlation window of a received WD data signal.

FIG. 18 includes an indication of one or more reference symbol locations that may be used to limit the correlation window of the received WD 106 data signal. Next generation 5G systems include many possible reference signals throughout the Resource Block to address issues such as Doppler. Signals may be configurable and used to approximate the channel impulse correlation window size with details of frequency and time.

Figure 19:
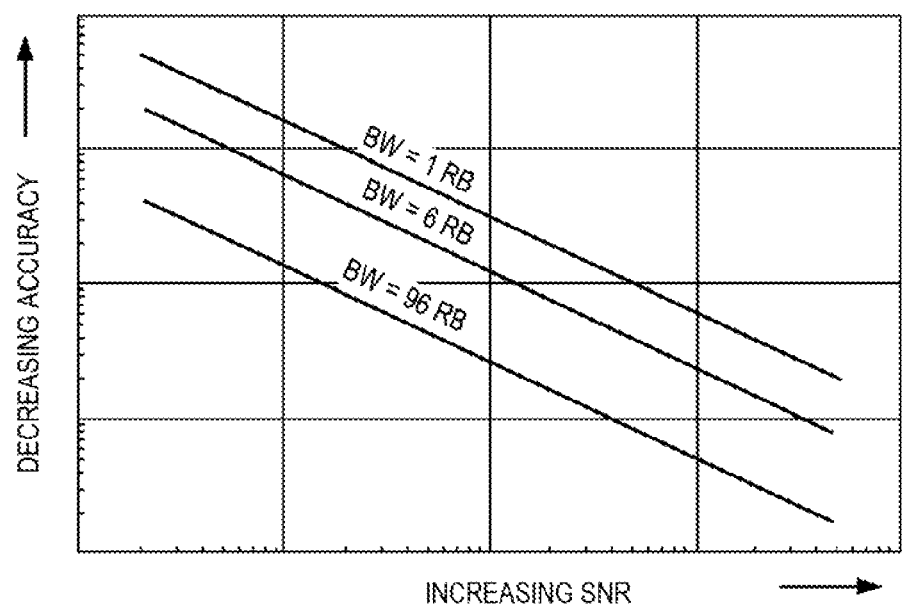
FIG. 19 illustrates a dependency between SNR and positioning accuracy.

While reference signals are useful for setting bounds on correlation windows, they represent only a small portion of the UL received signal power and are therefore limited in their ability to be used for high resolution positioning. As described previously, positioning accuracy is a log-linear relationship, where higher SNR—achieved through the integration of all WD 106 data—achieves the highest positioning accuracy. Increasing signal bandwidth also increases positioning accuracy. This is shown in FIG. 19. Combining data signal processing with correlation window determination may achieve the highest SNR, while eliminating correlation issues resulting from the use of data.

Thus, NB-IoT data signals may have low auto-correlation and can therefore be used to estimate the channel response. Also, the WD 106 uplink reference signals (e.g., DMRS) which the WD 106 transmits in every resource block can be used to confirm the channel response calculated from the received WD 106 data signals. Further, the WD 106 UL data signal which may be transmitted for a full transmission time interval (TTI) consisting of 14 symbols may be time aligned and can be used to calculate the channel impulse response even with very low RSRP levels to estimate time of arrival and calculate time difference of arrival.

In some embodiments, a limited set of cooperative neighbor base stations may be selected via calculation of dilution of precision and WD-measured neighbor reference signal received quality (RSRQ) to provide a ranked list. The neighbors may be included based on a dot product of the host and neighbor estimated vectors to the WD 106 expected location. In some embodiments, NB-IoT device locations may be determined by a remote processor at a central location by performing coordination functions and RSRP, ToA, TDoA, DoP and WD 106 trilateration calculations.

In some embodiments, other methods such as trilateration using RSRP may be used to provide an initial estimate of the WD 106 location, and then the expected WD 106 location may be refined through subsequent iterative calculations.

While processes in the figures may show a particular order of operations performed by certain embodiments of the present disclosure, it should be understood that such order is representative, and that alternative embodiments may perform the operations in a different order, combine certain operations, overlap certain operations, etc.

Those skilled in the art will recognize improvements and modifications to the embodiments of the present disclosure. All such improvements and modifications are considered within the scope of the concepts disclosed herein.

What is claimed is:

1. A network node configured to communicate with a wireless device (WD), the network node comprising:
   at least one processor; and
   memory storing software instructions configured to control the at least one processor to implement a process including:
      employing a coordinated multipoint process to decode data from a WD using signals received from the WD by the network node and from signals received from the WD by a plurality of cooperating network nodes;
      converting the decoded WD data into a time domain reference signal and convert the signals received from the plurality of cooperating network nodes into time domain neighbor signals;
      cross-correlating the time domain reference signal with the time domain neighbor signals to determine a time difference of arrival for each of the plurality of time domain neighbor signals; and
      calculating a position of the WD based on the time differences of arrival and based on locations of the cooperating network nodes.

2. A method implemented in a network node to estimate a time difference of arrival, TDoA, of signals received from a wireless device, the method comprising:
   employing a coordinated multipoint process to decode data from a WD using signals received from the WD by the network node and from signals received from the WD by a plurality of cooperating network nodes;
   converting the decoded WD data into a time domain reference signal and convert the signals received from the plurality of cooperating network nodes into time domain neighbor signals;
   cross-correlating the time domain reference signal with the time domain neighbor signals to determine a time difference of arrival for each of the plurality of time domain neighbor signals; and
   calculating a position of the WD based on the time differences of arrival and based on locations of the cooperating network nodes.

3. The method as claimed in claim 2, further comprising providing a reportConfigEUTRA WD measurement report with a negative A3-Offset greater than 19.

4. The method as claimed in claim 2, further comprising performing geometric dilution of precision calculations to select a set of cooperating network nodes for use in positioning calculations.

5. The method as claimed in claim 2, further comprising bounding a channel impulse response in the time domain using a calculated channel impulse response of a demodulation reference signal, DMRS, symbol from at least one of the plurality of time domain neighbor signals.

6. The method as claimed in claim 2, further comprising using a reference signal transmitted by the WD in every resource block to confirm a channel impulse response calculated from the cross correlation.

7. The method as claimed in claim 2, wherein a reference signal is selected from signals received from the WD by the network node as a signal having a signal to noise ratio, SNR, of at least 10 dB.

8. The method as claimed in claim 2, further comprising using trilateration based on reference signal received power, RSRP, to provide an initial estimate of WD location followed by subsequent iterations based on cross correlation of the time domain reference signal with the time domain neighbor signals.

9. The method as claimed in claim 2, wherein the network node is located remote from the cooperating network nodes and wherein positions of WDs are determined at the remote location.

10. The method as claimed in claim 2, wherein the received signals are transmitted over a full transmission time interval, TTI, consisting of 14 symbols.

11. A network node configured to communicate with a wireless device (WD), the network node comprising:
   at least one processor; and
   memory storing software instructions configured to control the at least one processor to implement a process including:
      employing a coordinated multipoint process to decode data from a WD using signals received from the WD by the network node and from signals received from the WD by a plurality of cooperating network nodes;
      converting the decoded WD data into a frequency domain reference signal and converting the signals received from the plurality of cooperating network nodes into frequency domain neighbor signals;
      multiplying a complex conjugate of the frequency domain reference signal by each of the plurality of frequency domain neighbor signals to produce a plurality of product signals;
      converting each of the product signals into a time domain signal to provide a time difference of arrival of each frequency domain neighbor signal; and
      calculating a position of the WD based on the time difference of arrival of each frequency domain neighbor signal and based on locations of the cooperating network nodes.

12. A method implemented in a network node to estimate a time difference of arrival, TDoA, of signals received from a wireless device, the method comprising:
   employing a coordinated multipoint process to decode data from a WD using signals received from the WD by the network node and from signals received from the WD by a plurality of cooperating network nodes;
   converting the decoded WD data into a frequency domain reference signal and converting the signals received from the plurality of cooperating network nodes into frequency domain neighbor signals;
   multiplying a complex conjugate of the frequency domain reference signal by each of the plurality of frequency domain neighbor signals to produce a plurality of product signals;
   converting each of the product signals into a time domain signal to provide a time difference of arrival of each frequency domain neighbor signal; and
   calculating a position of the WD based on the time difference of arrival of each frequency domain neighbor signal and based on locations of the cooperating network nodes.

13. The method as claimed in claim 12, further comprising providing a reportConfigEUTRA WD measurement report with a negative A3-Offset greater than 19.

14. The method as claimed in claim 12, further comprising performing geometric dilution of precision calculations to select a set of cooperating network nodes for use in positioning calculations.

15. The method as claimed in claim 12, further comprising bounding a channel impulse response in the time domain using a calculated channel impulse response of a demodulation reference signal, DIMS, symbol from at least one of the plurality of frequency domain neighbor signals.

16. The method as claimed in claim 12, further comprising using a reference signal transmitted by the WD in every resource block to confirm a channel impulse response calculated from the cross correlation.

17. The method as claimed in claim 12, wherein a reference signal is selected from signals received from the WD by the network node as a signal having a signal to noise ratio, SNR, of at least 10 dB.

18. The method as claimed in claim 12, further comprising using trilateration based on reference signal received power, RSRP, to provide an initial estimate of WD location followed by subsequent iterations based on cross correlation of a time domain reference signal with time domain neighbor signals.

19. The method as darned in claim 12, wherein the network node is located remote from the cooperating network nodes and wherein positions of WDs are determined at the remote location.

20. The method as claimed in claim 12 wherein the received signals are transmitted over a full transmission time interval, TTI, consisting of 14 symbols.

* * * * *